US012109672B2

(12) United States Patent
Aizawa et al.

(10) Patent No.: US 12,109,672 B2
(45) Date of Patent: Oct. 8, 2024

(54) WORKING TOOL

(71) Applicant: Koki Holdings Co., Ltd., Tokyo (JP)

(72) Inventors: Sotaro Aizawa, Ibaraki (JP); Toshinori Yasutomi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/050,644

(22) Filed: Oct. 28, 2022

(65) Prior Publication Data

US 2023/0137720 A1 May 4, 2023

(30) Foreign Application Priority Data

Oct. 29, 2021 (JP) ................................. 2021-177856

(51) Int. Cl.
*B25C 1/06* (2006.01)
*B25C 1/00* (2006.01)

(52) U.S. Cl.
CPC ................ *B25C 1/06* (2013.01); *B25C 1/001* (2013.01)

(58) Field of Classification Search
CPC .................................. B25C 1/06; B25C 1/001
See application file for complete search history.

(56) References Cited

U.S. PATENT DOCUMENTS 4,676,423 A * 6/1987 Ghibely .................... B25C 1/06 227/120
6,971,567 B1 * 12/2005 Cannaliato ................ B25C 1/06 173/205
11,400,573 B2 * 8/2022 Tan ........................... B25C 1/04
2009/0090762 A1 * 4/2009 Leimbach ................. B25C 5/13 227/136
2009/0114697 A1 * 5/2009 Gross ...................... B25C 1/001 227/120
2012/0325886 A1 * 12/2012 Adachi ................... B25C 1/008 227/2
2015/0298308 A1 * 10/2015 Kato ......................... B25C 1/06 318/484
2018/0126528 A1 * 5/2018 Pomeroy ................... B25C 5/13
2018/0154505 A1 * 6/2018 Sato ........................ B25C 1/047
2019/0314967 A1 * 10/2019 Garces ...................... B25C 1/06
2019/0381644 A1 * 12/2019 Vandenberg ............ B25C 1/003
2020/0070330 A1 * 3/2020 Carrier ....................... B25C 5/15
2020/0189080 A1 * 6/2020 Aizawa ...................... B25C 1/06
2021/0094160 A1 * 4/2021 Green ...................... B25C 1/043
2021/0299837 A1 * 9/2021 Garces .................... B25C 1/047
2021/0347022 A1 * 11/2021 Leathrum ............... B25C 1/047

FOREIGN PATENT DOCUMENTS

WO 2018/198672 A1 11/2018

* cited by examiner

*Primary Examiner* — Lucas E. A. Palmer
(74) *Attorney, Agent, or Firm* — Rimon P.C.

(57) ABSTRACT

A working tool includes a magazine unit in which a plurality of connected fasteners are stored in a rolled shape, an ejection unit to which the fastener is fed, a driver blade configured to strike the fastener held in the ejection unit to one side in a first direction, an electric motor configured to drive the driver blade by receiving an electric power, a feeder unit capable of moving in a second direction crossing the first direction and configured to feed the fastener stored in the magazine unit to the ejection unit by moving to one side in the second direction, a solenoid configured to drive the feeder unit by receiving an electric power, and a control unit configured to allow the solenoid to drive when a load of the electric motor satisfies a first condition.

21 Claims, 15 Drawing Sheets

10

WORKING TOOL

CROSS-REFERENCE TO RELATED APPLICATIONS

The disclosure of Japanese Patent Application No. 2021-177856 filed on Oct. 29, 2021 including the specification, drawings and abstract is incorporated herein by reference in its entirety.

TECHNICAL FIELD

The present invention relates to a working tool.

BACKGROUND ART

Patent Document 1 (International Patent Publication No. 2018/198672) discloses an electric driving tool which includes a magazine unit in which a plurality of rolled fasteners are stored and drives a feeder to feed the fasteners by an actuator.

SUMMARY OF THE INVENTION

Problem to be Solved by the Invention

However, since the actuator uses electric power, there is a fear that the power shortage occurs if the feeding operation of the feeder is to be carried out during driving of the drive unit that performs the driving operation. For this reason, there is a possibility that the feeding operation of the feeder is not carried out at an appropriate timing, resulting in the misfire. Although it is possible to set the timing of the feeding operation of the feeder in advance while avoiding the time zone in which the power shortage occurs in order to suppress the misfire, since the amount of required power varies depending on drive conditions such as the temperature of the working tool and the power supply situation, the timing of the feeding operation is unnecessarily delayed when there is power to spare. Therefore, it has been desired to improve the performance by improving the response from the operation by a worker to the driving operation.

Means for Solving the Problems

A working tool according to a first aspect includes a magazine unit in which a plurality of connected fasteners are stored in a rolled shape, an ejection unit to which the fastener is fed, a striking unit configured to strike the fastener held in the ejection unit to one side in a first direction, a first drive unit configured to drive the striking unit by receiving an electric power, a feeder unit capable of moving in a second direction crossing the first direction and configured to feed the fastener stored in the magazine unit to the ejection unit by moving to one side in the second direction, a second drive unit configured to drive the feeder unit by receiving an electric power, and a control unit configured to allow the second drive unit to drive when a load of the first drive unit satisfies a first condition.

Effects of the Invention

According to the present invention, it is possible to provide a working tool capable of suppressing the occurrence of misfire. Also, it is possible to provide a working tool with improved performance.

DETAILED DESCRIPTION

First Embodiment

A working tool according to the first embodiment will be described with reference to drawings.

Figure 1:
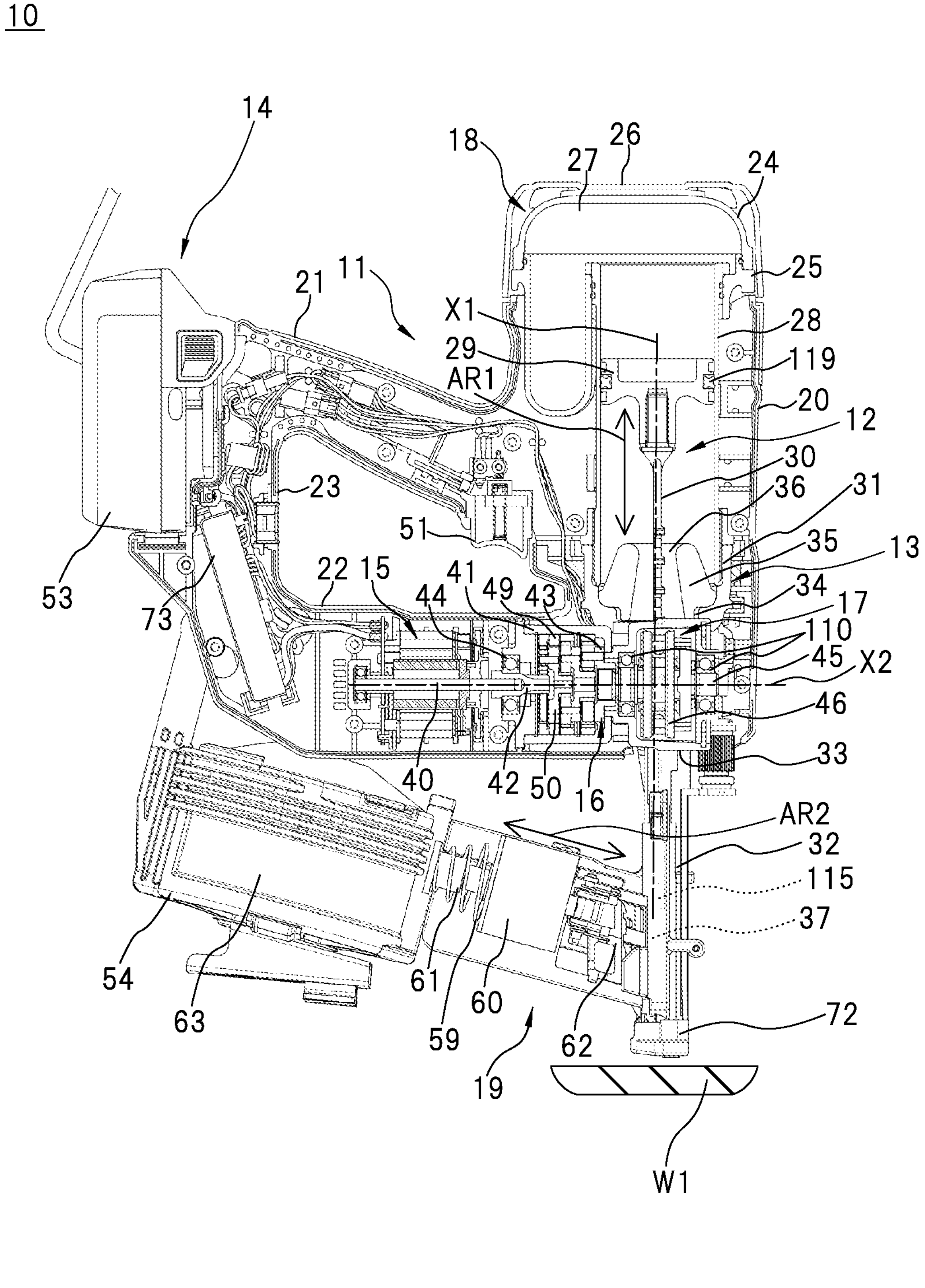
FIG. 1 is a cross-sectional view of a working tool according to the first embodiment.

FIG. 1 is a cross-sectional view of a working tool 10. The working tool 10 includes a housing 11, a striking mechanism 12, a nose unit 13, a power supply unit 14, an electric motor 15, a speed reducing mechanism 16, a conversion mechanism 17, a pressure accumulation container 18, a feeding mechanism 19, and a magazine unit 54.

In the following description, an upper portion of the page of FIG. 1 is referred to as an upper side, a lower portion of the page is referred to as a lower side, a right side of the page is referred to as a front side, and a left side of the page is referred to as a rear side in some cases. Also, the direction along a longitudinal direction of the page of FIG. 1 is referred to as a first direction AR1 in some cases.

Housing 11

The housing 11 is an outer shell element of the working tool 10. The housing 11 has a cylinder case 20, a handle 21 connected to the cylinder case 20, a motor case 22 connected to the cylinder case 20, and a mounting unit 23 connected to the handle 21 and the motor case 22. A cylinder 28 is supported in the cylinder case 20. The cylinder 28 is made of metal. The cylinder 28 is located with respect to the cylinder case 20 in a direction of a first center line X1 parallel to the first direction AR1 and in a radial direction (direction orthogonal to the first center line X1).

Striking Mechanism 12

The striking mechanism 12 has a piston 29 and a driver blade 30. The piston 29 is provided on the lower side in the first direction AR1 with respect to the pressure accumulation container 18 which will be detailed later in detail, and is always biased downward in the first direction AR1 by the pressure of a pressure chamber 27 provided in the pressure accumulation container 18. The piston 29 is movable inside the cylinder 28 along the first direction AR1. A sealing member 119 is attached to an outer peripheral surface of the piston 29. The sealing member 119 comes into contact with an inner peripheral surface of the cylinder 28 to form a sealing surface.

The driver blade 30 is made of, for example, metal. The driver blade 30 is connected to the piston 29 on the lower side of the piston 29 in the first direction AR1 and extends along the first center line X1. Since the piston 29 is movable in the first direction AR1 as described above, the driver blade 30 is also movable in the first direction AR1. A plurality of racks 47 (see FIG. 2) are arranged on the driver blade 30 at predetermined intervals along the first direction AR1 which is the moving direction. Note that the movement of the driver blade 30 to one side (downward) in the first direction AR1 in FIG. 1 is referred to as the descent. The movement of the driver blade 30 to the other side (upward) in the first direction AR1 in FIG. 1 is referred to as the ascent.

Nose Unit 13

The nose unit 13 is located and arranged with respect to the cylinder case 20 in the direction of the first center line X1 and in the radial direction of the cylinder 28. The nose unit 13 has a bumper support portion 31, an ejection unit 32, and a tubular portion 33. The bumper support portion 31 has a tubular shape and has a guide hole 34. The guide hole 34 is arranged about the first center line X1.

A bumper 35 is arranged inside the bumper support portion 31. The bumper 35 is integrally formed of synthetic rubber such as elastomer. The bumper 35 is provided with a guide hole 36 centered on the first center line X1. The driver blade 30 is movable within the guide hole 36 in the first direction AR1.

The ejection unit 32 is connected to the bumper support portion 31 and the tubular portion 33 and protrudes downward from the bumper support portion 31 in the first direction AR1. The ejection unit 32 has an ejection path 37, and the ejection path 37 is provided concentrically about the first center line X1. The driver blade 30 can move along the first direction AR1 in the ejection path 37. Nails which are fasteners stored in the magazine unit 54 to be described later are fed to the ejection path 37 of the ejection unit 32.

A push lever 72 is attached to a lower end portion of the ejection unit 32 in the first direction AR1. The push lever 72 is movable with respect to the ejection unit 32 within a predetermined range in the first direction AR1.

Power Supply Unit 14

The power supply unit 14 is detachably attached to the mounting unit 23 and is a DC power supply that supplies electric power to the electric motor 15 and the feeding mechanism 19. The power supply unit 14 has a storage case 53 and a plurality of battery cells stored in the storage case 53. The battery cell is a secondary battery that can be charged and discharged, and any one of a lithium ion battery, a nickel hydrogen battery, a lithium ion polymer battery, and a nickel cadmium battery can be used.

Electric Motor 15

The electric motor 15 functions as a first drive unit that rotates by receiving power supplied from the power supply unit 14 and drives the striking mechanism 12. The electric motor 15 is arranged in the motor case 22. The electric motor 15 is a brushless motor having a rotor and a stator. A second center line X2 which is the center of rotation of a rotation shaft 40 of the electric motor 15 is orthogonal to the first center line X1.

Speed Reducing Mechanism 16

The speed reducing mechanism 16 is provided in a gear case 41 in the motor case 22. The gear case 41 has a tubular shape and does not rotate with respect to the tubular portion 33 of the nose unit 13. The speed reducing mechanism 16 has an input element 42, an output element 43, and multiple sets of planetary gear mechanisms. The input element 42 of the speed reducing mechanism 16 is coupled to the rotation shaft 40 and is rotatably supported by a bearing 44.

Conversion Mechanism 17

Figure 2:
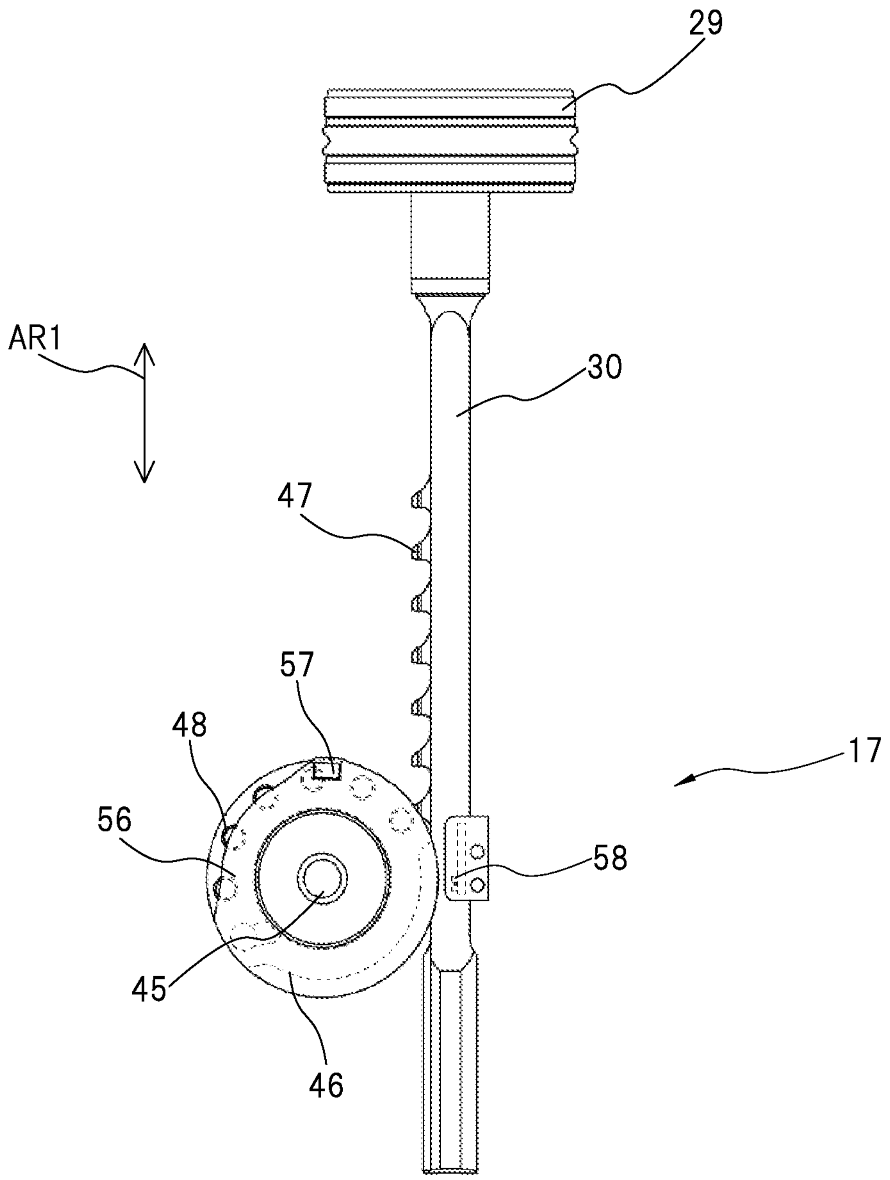
FIG. 2 is an external view of a speed reducing mechanism and a striking unit in the working tool.

The conversion mechanism 17 will be described with reference to FIG. 2 in addition to FIG. 1. FIG. 2 is an external view of the conversion mechanism 17, the piston 29, and the driver blade 30 seen from the front side.

The conversion mechanism 17 is arranged in the tubular portion 33 of the nose unit 13, and converts the rotational force of the output element 43 of the speed reducing mechanism 16 into a moving force of the driver blade 30 along the first direction AR1. The conversion mechanism 17 has a drive shaft 45, a pinwheel 46, and pinion pins 48 as shown in FIG. 1 and FIG. 2. The drive shaft 45 is rotatably supported by a bearing 110 about the second center line X2. The pinwheel 46 is fixed to the drive shaft 45. The pinwheel 46 has a plurality of pinion pins 48.

The plurality of pinion pins 48 are arranged at intervals in the rotation direction of the pinwheel 46 as shown in FIG. 2. The plurality of pinion pins 48 are arranged within a predetermined angular range in the rotation direction of the pinwheel 46. The plurality of pinion pins 48 can be independently engaged and disengaged with the plurality of racks 47 provided on the driver blade 30 described above. When the pinwheel 46 rotates counterclockwise in FIG. 2 and at least one pinion pin 48 and at least one rack 47 are engaged with each other, the rotational force of the pinwheel 46 is transmitted to the driver blade 30 of the striking mechanism 12. By the transmitted rotational force, the driver blade 30 moves upward in the first direction AR1 against the pressure of the pressure chamber 27. Namely, the conversion mechanism 17 functions as a lifting unit that lifts the driver blade 30 upward in the first direction AR1 by being rotated by the driving force of the electric motor 15 in a state of being engaged with the driver blade 30.

When all the pinion pins 48 are released from the racks 47, the rotational force of the pinwheel 46 is not transmitted to the driver blade 30.

As shown in FIG. 1, a rotation regulating mechanism 49 is provided in the gear case 41. The rotation regulating mechanism 49 is arranged between the elements constituting the planetary gear (for example, a carrier 50 and a ring fixed to the gear case 41). The rotation regulating mechanism 49 includes, for example, a roller and a ball. The rotation regulating mechanism 49 prevents the pinwheel 46 from rotating clockwise in FIG. 2 in the state where the pinion pin 48 and the rack 47 are engaged. Specifically, when the driver blade 30 is biased downward in the first direction AR1 in the state where the pinion pin 48 and the rack 47 are engaged, the pinwheel 46 receives clockwise torque in FIG. 2. At this time, the rotation regulating mechanism 49 bites between the carrier 50 and the ring to prevent the pinwheel 46 from rotating due to its wedging action. On the other hand, when the torque of the electric motor 15 is transmitted by the speed reducing mechanism 16, the rotation regulating mechanism 49 does not bite between the carrier 50 and the ring. Namely, the rotation regulating mechanism 49 allows the pinwheel 46 to rotate counterclockwise in FIG. 2.

Further, as shown in FIG. 2, the working tool 10 has a magnet holder 56, a magnet 57, and a pinwheel position detection sensor 58. The magnet holder 56 is provided on the pinwheel 46 and rotates together with the rotation of the pinwheel 46. The magnet 57 is provided on the magnet holder 56. The pinwheel position detection sensor 58 is, for example, a Hall sensor, and detects the magnetic field generated by the magnet 57 and outputs a first detection signal. Since the magnet 57 rotates together with the rotation of the pinwheel 46, the relative positional relationship with the pinwheel position detection sensor 58 changes. When the magnet 57 approaches the pinwheel position detection sensor 58 with the rotation, the pinwheel position detection sensor 58 outputs the first detection signal. Namely, the first detection signal is a signal indicating the rotation position of the pinwheel 46. The first detection signal is output to a control unit 73 which will be described later.

Pressure Accumulation Container 18

The pressure accumulation container 18 shown in FIG. 1 has a cap 24 and a holder 25 to which the cap 24 is attached. A head cover 26 is attached to the upper side of the cylinder case 20 in the first direction AR1, and the pressure accumulation container 18 is arranged in the cylinder case 20 and in the head cover 26. The pressure chamber 27 is provided in the pressure accumulation container 18. The pressure chamber 27 is filled with gas. The gas may be any compressible gas. As the gas, for example, an inert gas such as nitrogen gas or rare gas is used in addition to air. As described above, the striking mechanism 12 is always biased downward in the first direction AR1 by the pressure of the pressure chamber 27 provided in the pressure accumulation container 18. Namely, the pressure chamber 27 functions as a biasing unit that biases the striking mechanism 12 downward in the first direction AR1. Note that the description will be given on the assumption that the pressure chamber 27 is filled with air.

Magazine Unit 54

The magazine unit 54 is supported by the ejection unit 32 and the mounting unit 23. The magazine unit 54 stores a plurality of connected nails in a rolled shape. Specifically, the magazine unit 54 has a hollow drum portion 63 and the nails are stored in the drum portion 63. A plurality of nails are connected to each other by a connecting element such as an adhesive, a wire, or the like. The plurality of connected nails are arranged in the drum portion 63 in a spiral or rolled state.

Feeding Mechanism 19

The feeding mechanism 19 feeds the nails stored in the drum portion 63 of the magazine unit 54 into the ejection unit 32 along a second direction AR2. Note that the second direction AR2 is a direction which crosses the first direction AR1 and is not parallel to the second center line X2. Further, in the following description, the front side in the second direction AR2 is referred to also as one side, and the rear side in the second direction AR2 is referred to also as the other side.

The feeding mechanism 19 has a spring 59, a solenoid 60, an iron core 61, and a feeder unit 62. The feeder unit 62 can reciprocate together with the iron core 61 along the second direction AR2. In the feeder unit 62, a plurality of feed pawls (not shown) are provided at predetermined intervals along the second direction AR2.

The solenoid 60 has a bobbin, a coil provided in the bobbin, and the like. The iron core 61 can reciprocate with respect to the bobbin of the solenoid 60 along the second direction AR2. The iron core 61 is made of a magnetic material such as iron. The spring 59 is a biasing member that biases the iron core 61 toward the other side (rear side) in the second direction AR2, and locates the feeder unit 62 at the initial position. The coil of the solenoid 60 is connected to the power supply unit 14 and generates magnetic attractive force when current is supplied from the power supply unit 14. By this magnetic attractive force, the iron core 61 moves to one side (front side) in the second direction AR2 against the biasing force of the spring 59. Along with this movement of the iron core 61, the feeder unit 62 also moves to one side in the second direction AR2.

When the current supply by the power supply unit 14 ends, the coil cancels the magnetic attractive force. As a result, the iron core 61 moves to the other side in the second direction AR2 by the biasing force of the spring 59. Along with this movement of the iron core 61, the feeder unit 62 also moves to the other side in the second direction AR2 and returns to the initial position.

Regarding Control System of Working Tool 10

Figure 3:
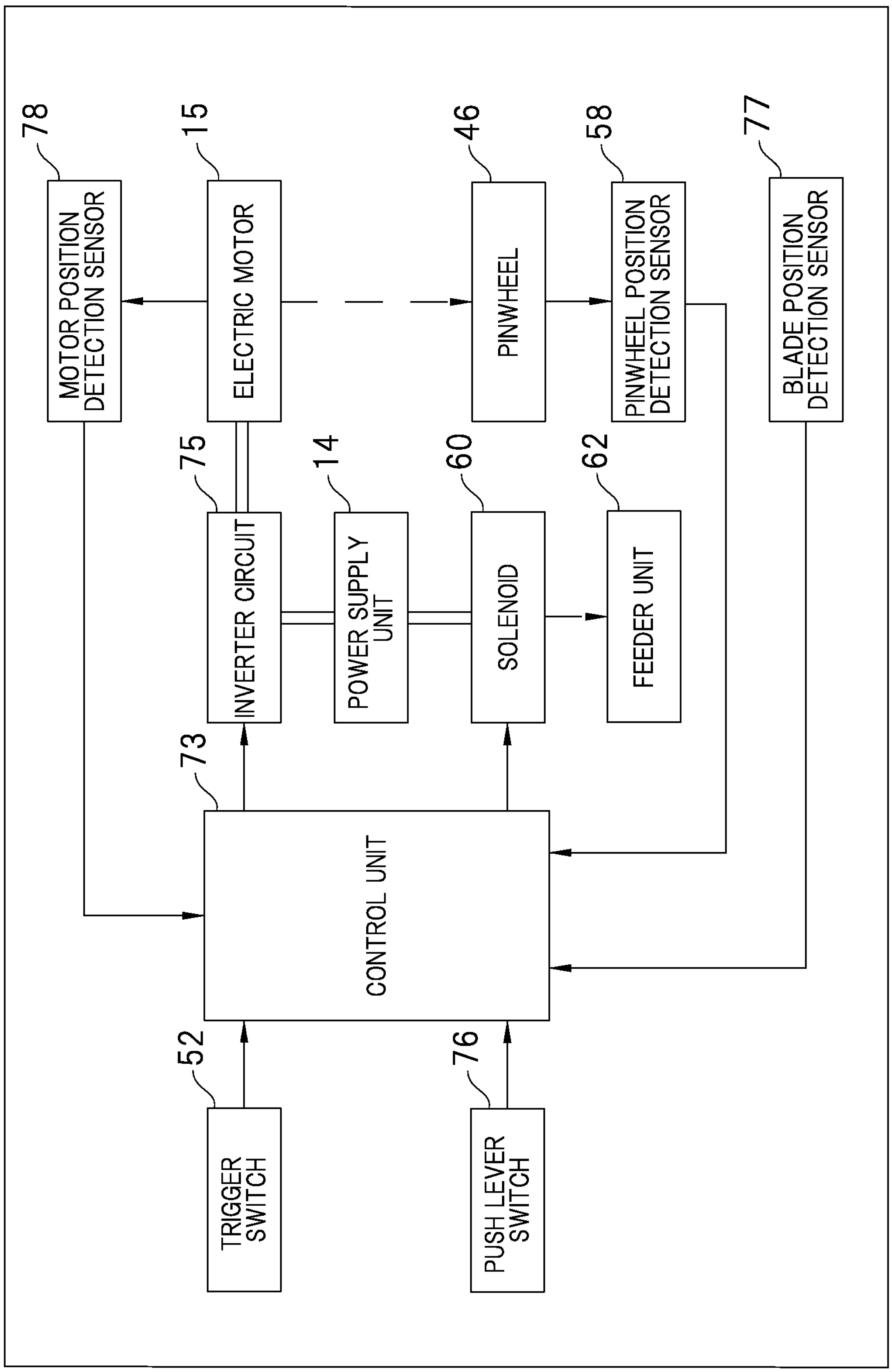
FIG. 3 is a block diagram for describing a main configuration of the working tool.

As shown in the block diagram of FIG. 3, the working tool 10 includes a control unit 73, an inverter circuit 75, a trigger switch 52, a push lever switch 76, a blade position detection sensor 77, and a motor position detection sensor 78 in addition to the configuration shown in FIG. 1 and FIG. 2. The control unit 73 is provided in the mounting unit 23 (see FIG. 1). The control unit 73 is a microcomputer having an input/output interface, an arithmetic processing unit, and a storage unit. The control unit 73 controls the inverter circuit 75. The control unit 73 controls the timing of power supply to the electric motor 15 and the solenoid 60 as will be described later in detail. Although details will be described later, the control unit 73 performs control to allow the solenoid 60 to drive when the load of the electric motor 15 satisfies a first condition.

The inverter circuit 75 is controlled by the control unit 73 to connect and disconnect the electric circuit between the power supply unit 14 and the electric motor 15. The inverter circuit 75 includes a plurality of switching elements, and the plurality of switching elements can be turned on/off individually.

A trigger 51 is provided on the handle 21 as shown in FIG. 1. A worker, that is, a user can operate the trigger 51 while gripping the handle 21. The trigger switch 52 shown in FIG. 3 is provided in the handle 21. The trigger switch 52 outputs a first operation signal to the control unit 73 when an operation force is applied to the trigger 51. When the operation force on the trigger 51 is released, the trigger switch 52 stops the output of the first operation signal.

The push lever switch 76 is provided in the ejection unit 32. The push lever switch 76 outputs a second operation signal to the control unit 73 when the push lever 72 is pressed to a workpiece W1 by the operation of the user. When the push lever 72 is separated from the workpiece W1, the push lever switch 76 stops the output of the second operation signal.

The blade position detection sensor 77 shown in FIG. 3 is provided in the housing 11. The blade position detection sensor 77 is, for example, a Hall sensor, and detects a magnetic field generated by a magnet provided at a tip 115 (see FIG. 1) of the driver blade 30, thereby detecting the position of the driver blade 30 in the first direction AR1. Specifically, when the tip 115 of the driver blade 30 is located on the upper side in the first direction AR1 than the head of the nail fed to the ejection unit 32 which will be described later in detail, the blade position detection sensor 77 outputs a second detection signal to the control unit 73. Namely, the control unit 73 functions as a striking detection unit which detects that the position of the driver blade 30 in the first direction AR1 is located on the other side (upper side) in the first direction AR1 than a predetermined position, by using the second detection signal from the blade position detection sensor 77.

The first detection signal output from the pinwheel position detection sensor 58 described above is input to the control unit 73. As described above, since the first detection signal is a signal indicating the rotation position of the pinwheel 46, the control unit 73 functions as a lifting detection unit which detects the rotation position of the pinwheel 46 based on the first detection signal.

Further, as described above, the driver blade 30 moves along the first direction AR1 along with the rotation of the pinwheel 46. Accordingly, the control unit 73 estimates the position of the driver blade 30 in the first direction AR1 from the detected rotation position of the pinwheel 46. In this case, the data indicating the relationship between the rotation position of the pinwheel 46 and the position of the driver blade 30 in the first direction AR1 is acquired by conducting tests, simulations, etc., and the acquired data is stored in the storage unit in the control unit 73. The control unit 73 refers to this data to estimate the position of the driver blade 30 in the first direction AR1.

The motor position detection sensor 78 is, for example, a Hall sensor, and is provided in the electric motor 15 described above. The motor position detection sensor 78 outputs a rotation position signal to the control unit 73 based on the change in the magnetic field caused by rotation of the rotor of the electric motor 15. Since the rotation position signal is based on the change in the magnetic field caused by the rotation of the electric motor 15, it indicates the rotation position (rotation angle) of the rotation shaft 40 of the electric motor 15. Therefore, the control unit 73 functions as a motor position detection unit that calculates (detects) the rotation position (rotation angle) of the rotation shaft 40 of the electric motor 15 by using the rotation position signal.

As described above, the driver blade 30 is moved along the first direction AR1 by the pinwheel 46 rotated by the rotation shaft 40 of the electric motor 15. Accordingly, the control unit 73 estimates the position of the driver blade 30 in the first direction AR1 from the detected rotation position of the electric motor 15. In this case as well, the data indicating the relationship between the rotation position of the electric motor 15 and the position of the driver blade 30 in the first direction AR1 is acquired by conducting tests, simulations, etc., and the acquired data is stored in the storage unit in the control unit 73. The control unit 73 refers to this data to estimate the position of the driver blade 30 in the first direction AR1.

Fastener Feeding Operation

Next, the fastener feeding operation of a nail 55 to the ejection unit 32 by the feeding mechanism 19 will be described.

The operation of the feeding mechanism 19 will be described with reference to FIG. 4A to FIG. 4F. FIG. 4A to FIG. 4F are diagrams each showing the feeding mechanism 19, the piston 29, and the driver blade 30 in the cross-sectional view shown in FIG. 1.

Figures 4A, 4B, 4C, 4D, 4E, 4F:
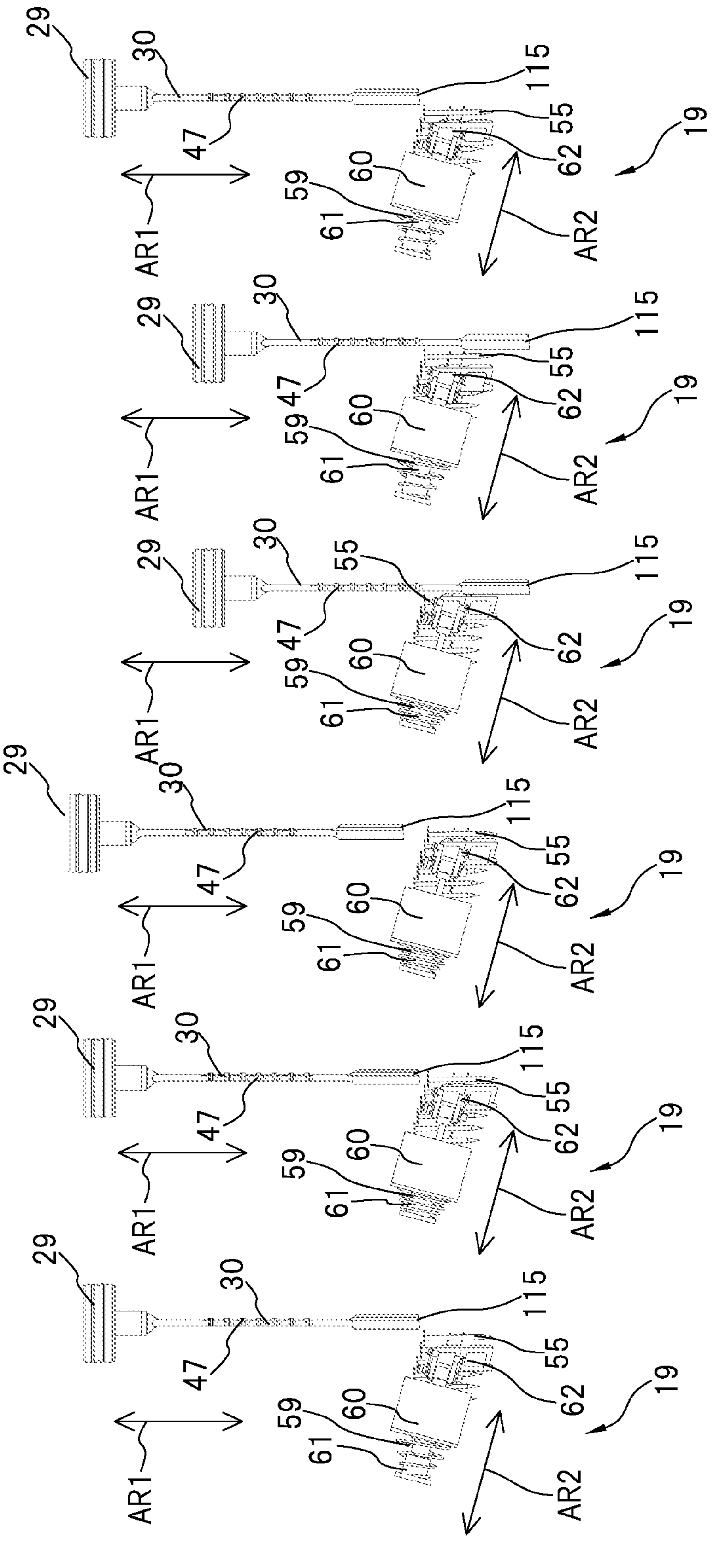
FIG. 4A to FIG. 4F are diagrams for describing an operation of a feeding mechanism in the first embodiment.

FIG. 4A shows the state where the driver blade 30 is stopped at the standby position, which is a position on the upper side in the first direction AR1 than the head of the nail 55 fed to the ejection unit 32, and the feeder unit 62 of the feeding mechanism 19 is stopped at the initial position. When the driver blade 30 is stopped at the standby position, the tip 115 of the driver blade 30 (the end portion on the lower side in the first direction AR1) is located on the upper side in the first direction AR1 than the head of the nail 55 located closest to the ejection path 37.

When the current output from the power supply unit 14 is supplied, the solenoid 60 generates a magnetic attractive force. By this magnetic attractive force, the iron core 61 moves to one side (front side) in the second direction against the biasing force of the spring 59. Along with the movement of the iron core 61, the feeder unit 62 is driven toward the ejection unit 32. Namely, the solenoid 60 functions as a second drive unit that drives the feeder unit 62.

The feed pawl provided in the feeder unit 62 enters between the nails 55 that are connected by the connecting element. When the feeder unit 62 is moved to one side in the second direction AR2 by the solenoid 60, the nail 55 is sent to the ejection unit 32 on one side in the second direction AR2 by the feed pawl that moves together with the feeder unit 62. In this way, the feeder unit 62 moves to one side in the second direction AR2, thereby feeding the nail 55 located at the head (on one side in the second direction AR2) among the nails 55 stored in the magazine unit 54 to the ejection unit 32.

FIG. 4B shows the state where the nail 55 is moved to the position below the tip 115 of the driver blade 30 (hereinafter, referred to as a fastener feeding position) by the movement of the feeder unit 62 to one side in the second direction AR2. Current supply to the solenoid 60 continues even when the nail 55 is located at the fastener feeding position.

When the electric power output from the power supply unit 14 is supplied to the electric motor 15 in the state where the nail 55 is located at the fastener feeding position, the conversion mechanism 17 is rotated by the driving force of the electric motor 15 in the state of being engaged with the driver blade 30 as described above, thereby lifting the driver blade 30 upward in the first direction AR1. In the following description, the state where the tip 115 of the driver blade 30 is located on the other side (upper side) in the first direction AR1 with respect to the fastener feeding position, that is, the state where the first detection signal and the second detection signal are output is referred to also as a second condition.

FIG. 4C shows the state where the driver blade 30 is lifted and reaches the top dead center on the upper side in the first direction AR1 compared to the cases shown in FIG. 4A and FIG. 4B. The top dead center of the driver blade 30 is the position where the piston 29 is farthest from the bumper 35 in the first direction AR1. When the pinwheel 46 rotates further from this state and all the pinion pins 48 are released from the racks 47, the rotational force of the pinwheel 46 ceases to be transmitted to the driver blade 30. As a result, the driver blade 30 descends due to the pressure of the pressure chamber 27 and strikes the nail 55 located at the fastener feeding position. Namely, the driver blade 30 functions as a striking unit that strikes the nail 55, which is a fastener held by the feeder unit 62 of the feeding mechanism 19, toward one side (lower side in the drawing) in the first direction AR1. The nail 55 is struck by the driver blade 30 and is driven into the workpiece W1.

After the driver blade 30 strikes the nail 55, the piston 29 shown in FIG. 1 collides with the bumper 35. The bumper 35 with which the piston 29 collides absorbs the kinetic energy of the driver blade 30. As a result, as shown in FIG. 4D, the driver blade 30 reaches the bottom dead center on the lower side in the first direction AR1 compared to the cases shown in FIG. 4A to FIG. 4C and stops descending. Namely, the bottom dead center of the driver blade 30 is the position where the piston 29 is in contact with the bumper 35.

When the driver blade 30 reaches the bottom dead center and stops descending, the current supply from the power supply unit 14 to the solenoid 60 is stopped. As described above, when the current supply by the power supply unit 14 is stopped, the iron core 61 is moved to the other side in the second direction AR2 by the biasing force of the spring 59. As a result, as shown in FIG. 4E, the feeder unit 62 is returned to the initial position. When the feeder unit 62 returns to the initial position, the feed pawl provided in the feeder unit 62 enters between the nails 55 connected by the connecting element.

The pinwheel 46 is rotated by the rotation of the electric motor 15 and the pinion pin 48 and the rack 47 are engaged again. Then, the driver blade 30 moves upward in the first direction AR1 against the pressure of the pressure chamber 27. As a result, as shown in FIG. 4F, the driver blade 30 moves to the standby position on the upper side in the first direction AR1 compared to the states shown in FIG. 4D and FIG. 4F.

Operation Timing

Figure 5A:
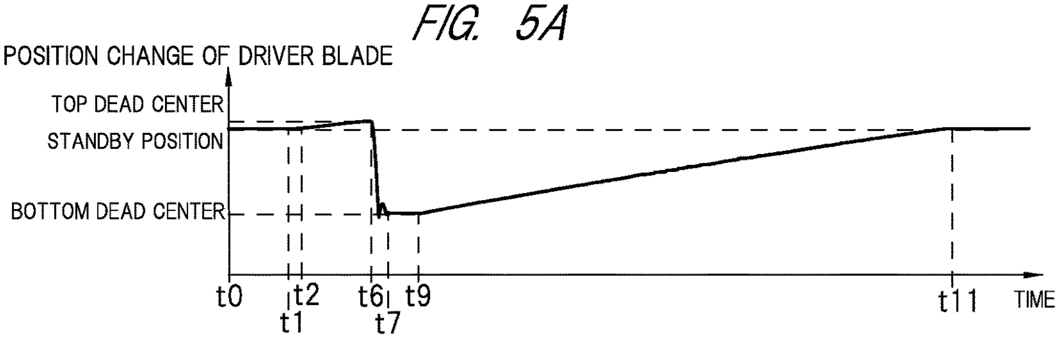
FIG. 5A to FIG. 5G are timing charts for describing an operation of the working tool according to the first embodiment.
Figure 5B:
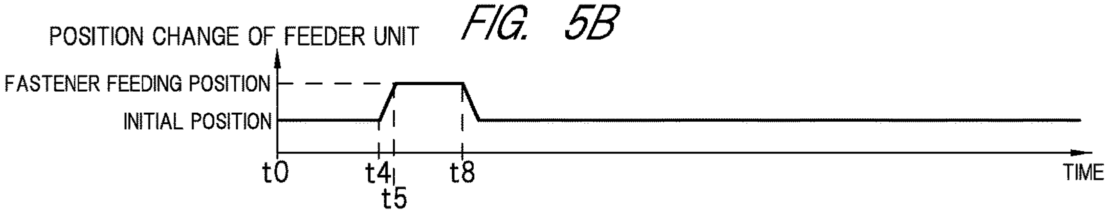
Figure 5C:
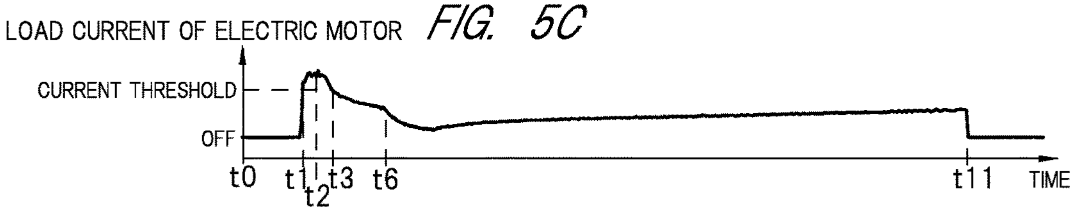
Figure 5D:
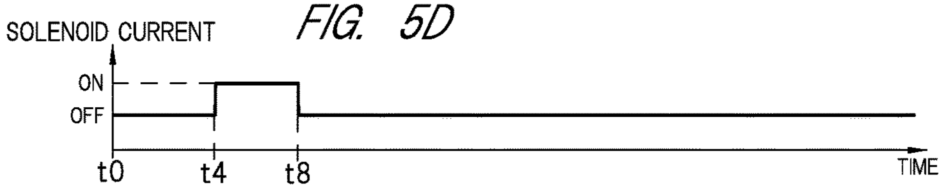
Figure 5E:
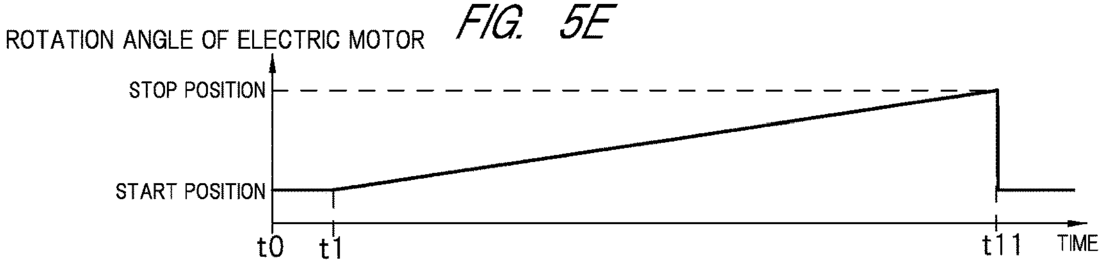
Figure 5F:
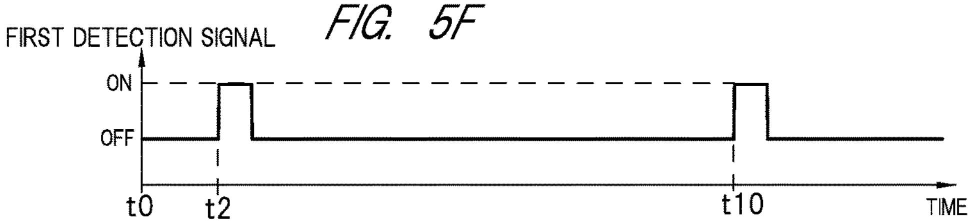
Figure 5G:
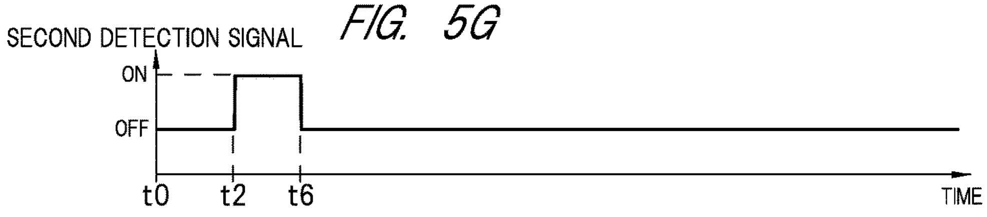

The operation timing of the working tool 10 will be described with reference to the drawings. FIG. 5A to FIG. 5G are timing charts in the case where the single nail 55 is driven into the workpiece W1. FIG. 5A shows the relationship between the position of the driver blade 30 in the first direction AR1 and the time, and FIG. 5B shows the relationship between the position of the feeder unit 62 in the second direction AR2 and the time. FIG. 5C shows the relationship between the load current of the electric motor 15 and the time, and FIG. 5D shows the relationship between the current value supplied to the solenoid 60 and the time. FIG. 5E shows the relationship between the rotation angle of the electric motor 15 and the time, FIG. 5F shows the relationship between the first detection signal output from the pinwheel position detection sensor 58 and the time, and FIG. 5G shows the relationship between the second detection signal output from the blade position detection sensor 77 and the time.

At time t0, when the control unit 73 detects at least one of the off of the trigger switch 52 and the off of the push lever switch 76 (that is, when at least one of the first operation signal and the second operation signal is not output), the control unit 73 stops the electric motor 15 (see FIG. 5C and FIG. 5D). On the other hand, the driver blade 30 is biased downward in the first direction AR1 by the pressure of the pressure chamber 27 and is stopped at the standby position (see FIG. 5A). The standby position of the driver blade 30 is located between the top dead center and the bottom dead center.

At time t1, when the control unit 73 detects that the first operation signal is output from the trigger switch 52 and the second operation signal is output from the push lever switch 76, the control unit 73 causes the power supply unit 14 to start the power supply to the electric motor 15 (see FIG. 5C). Namely, the trigger 51 and the push lever 72 function as operation units that switch the driving state of the electric motor 15 by being operated by the user.

Since the torque increases when the electric motor 15 starts rotating, the load current of the electric motor 15 becomes a large value at time t1 and starts decreasing after a predetermined time elapses (after time t2) as shown in FIG. 5C. The electric motor 15 starts to rotate by the electric power whose supply is started at time t1, and the rotation angle increases as time elapses as shown in FIG. 5E.

When the rotational force of the electric motor 15 is transmitted to the pinwheel 46 and the pinwheel 46 is rotated, the driver blade 30 ascends to the upper side in the first direction AR1 at time t1 as shown in FIG. 5A. Along with the ascent of the driver blade 30, the pressure of the pressure chamber 27 also rises.

At time t2, since the pinwheel 46 is rotated and the magnet 57 approaches the pinwheel position detection sensor 58, the first detection signal is output (see FIG. 5F). Further, at time t2, the blade position detection sensor 77 detects that the driver blade 30 has moved to the upper side in the first direction AR1 than the predetermined position, and outputs the second detection signal (see FIG. 5G). Based on the first detection signal and the second detection signal, the control unit 73 can estimate that the value of the load current of the electric motor 15 has decreased and the timing when it falls below a current threshold described later is approaching.

After time t2, the load current of the electric motor 15 gradually decreases as described above. After time t3, the value of the load current falls below a preset current threshold as shown in FIG. 5C. The current threshold is set to the value smaller than the load current flowing through the electric motor 15 when the driver blade 30 moves from the standby position to the top dead center and larger than the load current flowing through the electric motor 15 when the driver blade 30 moves from the bottom dead center to the standby position as described later (from time t6 to time t11 in FIG. 5C).

Since both the first condition that the load current of the electric motor 15 falls below the current threshold and the second condition that the first detection signal and the second detection signal are output are satisfied at time t3, the control unit 73 causes the power supply unit 14 to start supplying current to the solenoid 60 at time t4 (see FIG. 5D). Consequently, at time t5, the feeder unit 62 moves to one side (front side) in the second direction AR2, and is located at the fastener feeding position where the nail 55 is fed to the ejection unit 32 at time t5 (see FIG. 5B). Namely, the nail 55 is located on the lower side with respect to the driver blade 30 as shown in FIG. 4B.

At time t6, the driver blade 30 reaches the top dead center by the rotation of the pinwheel 46 as shown in FIG. 4C (see FIG. 5A). Thereafter, all the pinion pins 48 are released from the racks 47 and the driver blade 30 descends by the pressure of the pressure chamber 27. At this time, as shown in FIG. 5G, the blade position detection sensor 77 stops outputting the second detection signal.

When the driver blade 30 descends and strikes the nail 55 at the fastener feeding position, the driver blade 30 reaches the bottom dead center (see FIG. 4D) and stops there at time t7 as shown in FIG. 5A. Even after the driver blade 30 reaches the bottom dead center, the electric motor 15 continues to rotate. Namely, supply of electric power from the power supply unit 14 to the electric motor 15 is continued.

At time t8, the control unit 73 causes the power supply unit 14 to stop supplying current to the solenoid 60 as shown in FIG. 5D. Consequently, as shown in FIG. 5B, the feeder unit 62 starts moving to the other side (rear side) in the second direction at time t8.

Since the electric motor 15 continues to rotate as described above, the pinwheel 46 also continues to rotate. Consequently, the pinion pins 48 and the racks 47 are engaged again. As a result, as shown in FIG. 5A, the driver blade 30 ascends again toward the upper side in the first direction AR1 from the bottom dead center to the standby position at time t9.

Thereafter, as the driver blade 30 ascends, the first detection signal is output from the pinwheel position detection sensor 58 at time t10 as shown in FIG. 5F. Based on this first detection signal, the control unit 73 can estimate that the driver blade 30 ascends and is approaching the standby position. As shown in FIG. 5A, when the driver blade 30 reaches the standby position at time t11, the control unit 73 causes the power supply unit 14 to stop supplying electric power to the electric motor 15. As a result, as shown in FIG. 5C and FIG. 5E, both the load current and the rotation angle of the electric motor 15 become the same values as those at time t0.

Next, with reference to FIG. 6A to FIG. 6H, the power supply operation of the working tool 10 when continuously driving the nails 55 into the workpiece W1 will be described. FIG. 6A to FIG. 6G show the relationship between the position of the driver blade 30 and the time, the relationship between the position of the feeder unit 62 and the time, the relationship between the load current of the electric motor 15 and the time, the relationship between the current value supplied to the solenoid 60 and the time, the relationship between the rotation angle of the electric motor 15 and the time, the relationship between the output of the first detection signal and the time, and the relationship between the output of the second detection signal and the time, respectively. FIG. 6H shows the relationship between the first and second operation signals output from the trigger switch 52 and the push lever switch 76 and the time.

Figure 6A:
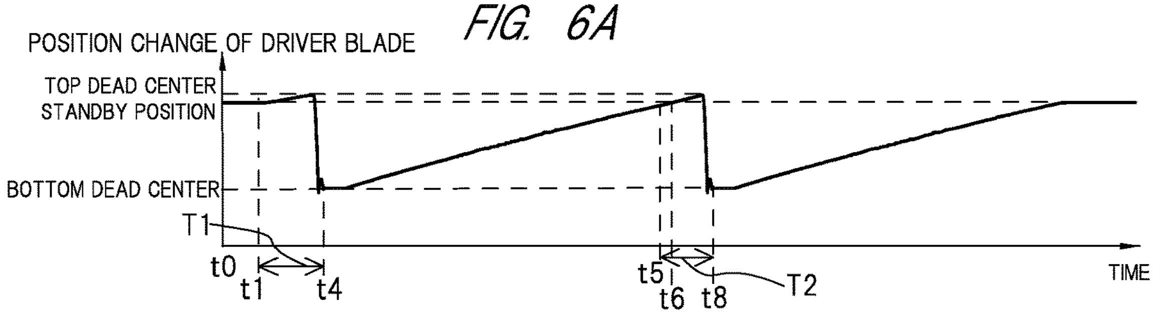
FIG. 6A to FIG. 6H are timing charts for describing an operation of the working tool according to the first embodiment.
Figure 6B:
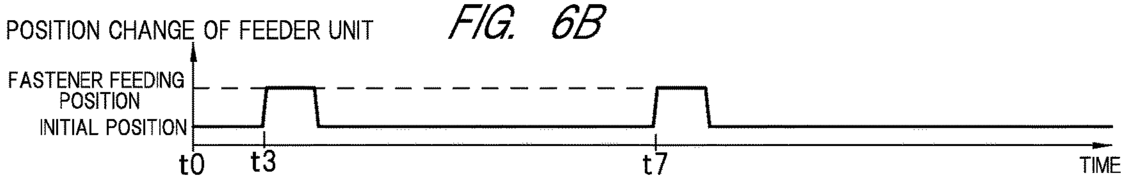
Figure 6C:
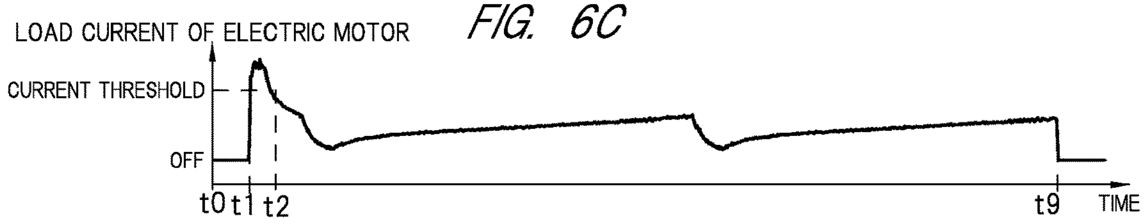
Figure 6D:
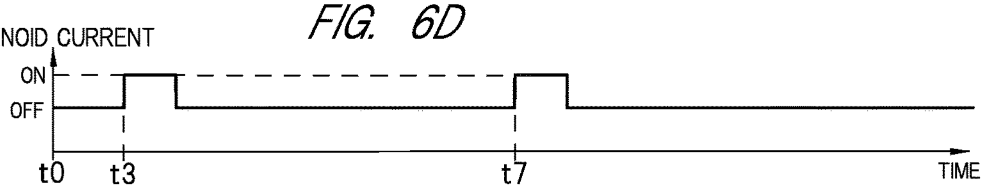
Figure 6E:
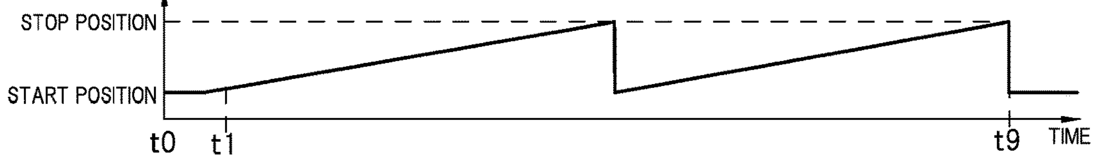
Figure 6F:
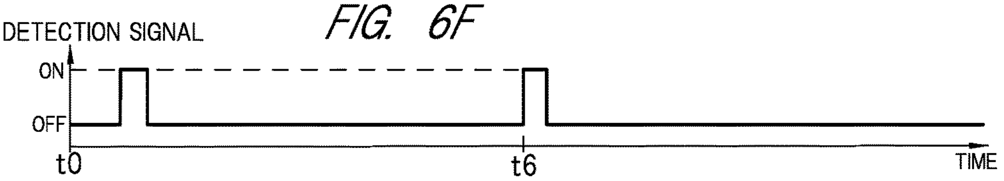
Figure 6G:
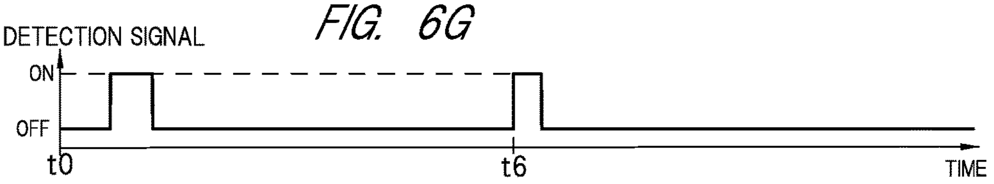
Figure 6H:
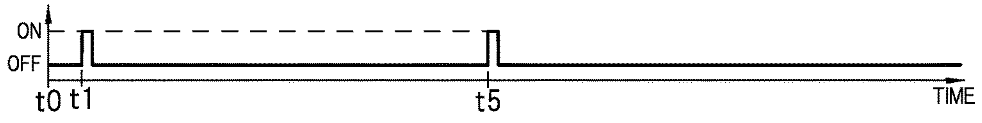

Times t1, t2, t3, and t4 in FIG. 6A to FIG. 6H correspond to times t1, t3, t4, and t7 in FIG. 5A to FIG. 5G, respectively. Namely, when the first operation signal and the second operation signal are output at time t1 as shown in FIG. 6H, the control unit 73 causes the power supply unit 14 to start supplying electric power to the electric motor 15 as shown in FIG. 6C. Then, as shown in FIG. 6A, the driver blade 30 starts to ascend from the standby position.

When the load current of the electric motor 15 falls below the current threshold at time t2 as shown in FIG. 6C, the control unit 73 starts supplying current to the solenoid 60 at time t3 as shown in FIG. 6B. After reaching the top dead center, the driver blade 30 descends and reaches the bottom dead center at time t4 as shown in FIG. 6A. Namely, the first nail 55 can be driven during time period T1 (=t4-t1) from time t1 to time t4. Thereafter, the position of the driver blade 30, the position of the feeder unit 62, the load current of the electric motor 15, the current supplied to the solenoid 60, the rotation angle of the electric motor 15, the first detection signal of the pinwheel position detection sensor 58, and the second detection signal of the blade position detection sensor 77 transition in the same manner as those after time t7 in FIG. 5A to FIG. 5G.

When the first operation signal and the second operation signal are output at time t5 as shown in FIG. 6H, the driver blade 30 reaches the standby position at time t6 as shown in FIG. 6A, the first detection signal is output from the pinwheel position detection sensor 58 as shown in FIG. 6F, and the second detection signal is output from the blade position detection sensor 77 as shown in FIG. 6G, so that both the first condition and the second condition are satisfied. At time t7, the control unit 73 starts supplying current to the solenoid 60 as shown in FIG. 6D, and the feeder unit 62 starts moving from the initial position as shown in FIG. 6B. Namely, in the case where the operation for driving the second nail 55 is performed before the driver blade 30 reaches the standby position, the feeder unit 62 can be moved when the driver blade 30 reaches a predetermined position on the upper side than the head of the nail 55. Therefore, the response from when the operation for driving the second nail 55 is performed to when the nail 55 is fed can be shortened.

After reaching the top dead center, the driver blade 30 starts to descend, and reaches the bottom dead center after driving the second nail 55 at time t8 as shown in FIG. 6A. Namely, the second nail 55 can be driven during time period T2 (=t8-t5) from time t5 to time t8.

Since the electric motor 15 continues to rotate even after driving the first nail 55, the load current of the electric motor 15 does not become a large value as in the period from time t1 to time t2 due to inertia and does not exceed the current threshold, so that the first condition is always satisfied. In this case, since the driving of the feeder unit 62 can be started immediately when the first detection signal and the second detection signal are output and the second condition is satisfied, the time period from time t5 to time t6 becomes shorter than the time period (t2-t1) required until the load current falls below the current threshold when driving the first nail 55. Therefore, the time period from when the first operation signal and the second operation signal are output at time t5 to when the feeder unit 62 starts moving at time t7 becomes shorter than the time period (t3-t1) until the feeder unit 62 starts to move when driving the first nail 55.

Further, in order to ensure the time required for the movement of the feeder unit 62 so that the driver blade 30 does not start to descend from the top dead center before the nail 55 is fed to the fastener feeding position, the rotation speed of the electric motor 15 is restricted until the load current of the electric motor 15 falls below the current threshold, when driving the first nail 55. On the other hand, when driving the second and subsequent nails 55, since the load current of the electric motor 15 does not exceed the current threshold, the rotation speed of the electric motor 15 does not need to be restricted. Namely, when driving the second and subsequent nails 55, the electric motor 15 can be driven at a higher speed than that when driving the first nail 55. As a result, the time period T2 (=t8-t5) required for driving the second nail 55 becomes shorter than the time period T1 (=t4-t1) required for driving the first nail 55.

Thereafter, when the driver blade 30 reaches the standby position at time t9, the control unit 73 causes the power supply unit 14 to stop supplying electric power to the electric motor 15 as shown in FIG. 6C.

According to the first embodiment described above, the following effects can be obtained.

(1) The working tool 10 includes the magazine unit 54, the ejection unit 32, the driver blade 30, the electric motor 15, the feeder unit 62, the solenoid 60, and the control unit 73. The magazine unit 54 stores a plurality of connected nails 55 in a rolled shape. The nail 55 is fed to the ejection unit 32. The driver blade 30 strikes the nail 55 held by the ejection unit 32 to one side in the first direction AR1. The electric motor 15 receives electric power to drive the driver blade 30. The feeder unit 62 is movable in the second direction AR2 that crosses the first direction AR1, and feeds the nails 55 stored in the magazine unit 54 to the ejection unit 32 by moving toward one side (front side) in the second direction AR2. The solenoid 60 receives electric power to drive the feeder unit 62. The control unit 73 allows the solenoid 60 to drive when the load of the electric motor 15 satisfies the first condition. Specifically, the first condition is that the load current of the electric motor 15 falls below the current threshold. Consequently, since electric power is not supplied to the solenoid 60 in the state where the load current of the electric motor 15 exceeds the current threshold, the feeder unit 62 is not driven in the state where the power supplied from the power supply unit 14 is insufficient and the misfire of the nail 55 can be suppressed.

(2) The current threshold is set so as to be smaller than the load current flowing through the electric motor 15 when the driver blade 30 moves from the standby position to the top dead center and to be larger than the load current flowing through the electric motor 15 when the driver blade 30 moves from the bottom dead center to the standby position. Consequently, since current supply to the solenoid 60 is started when a large load current ceases to flow through the electric motor 15, the time period from when the operation to drive the nail 55 is performed to when the nail 55 is fed to the fastener feeding position can be shortened, and performance and operability can be improved.

(3) The control unit 73 allows the solenoid 60 to drive when the driver blade 30 is located on the other side in the first direction AR1 with respect to the fastener feeding position. Consequently, the nail 55 can be supplied to the fastener feeding position without colliding with the driver blade 30, so that it is possible to suppress the occurrence of improper loading of the nail 55.

(4) With the working tool 10 according to the first embodiment described above, it is possible to control the timing of starting the current supply to the solenoid 60 in accordance with the temperature inside the housing 11.

FIG. 7A to FIG. 7G are timing charts in the case where the working tool 10 drives the single nail 55 into the workpiece W1, in which the solid line indicates the case where the temperature inside the housing 11 is low and the dashed line indicates the case where the temperature inside the housing 11 is high. Further, similarly to FIG. 4A to FIG. 4G, FIG. 7A to FIG. 7G show the relationship between the position of the driver blade 30 and the time, the relationship between the position of the feeder unit 62 in the second direction and the time, the relationship between the load current of the electric motor 15 and the time, the relationship between the current value supplied to the solenoid 60 and the time, the relationship between the rotation angle of the electric motor 15 and the time, the relationship between the output of the first detection signal and the time, and the relationship between the output of the second detection signal and the time, respectively.

Figure 7A:
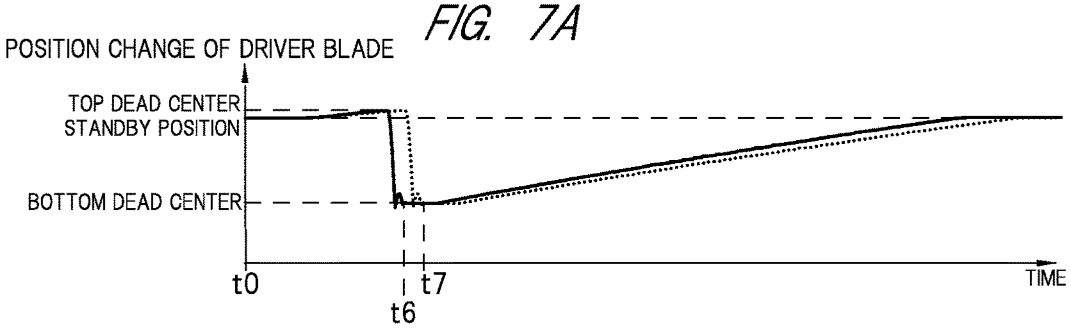
FIG. 7A to FIG. 7G are timing charts for describing an operation of the working tool which changes depending on a temperature inside a housing.
Figure 7B:
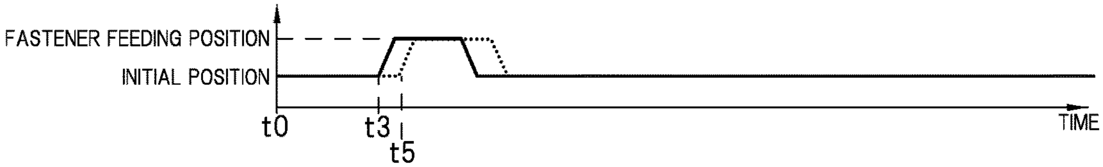

When the temperature in the housing 11 rises, the internal pressure of the housing 11 increases and the load for lifting the driver blade 30 increases. Therefore, the time period after the first operation signal and the second operation signal are output until the driver blade 30 moves along the first direction AR1 to drive the nail 55 and reaches the bottom dead center to stop there increases. As shown in FIG. 7A, it takes only the time period until time t6 for the driver blade 30 to reach the bottom dead center when the temperature is low, but it takes the time period until time t7 when the temperature is high. Namely, the response from the operation for driving the nail 55 to the completion of the driving of the nail 55 is delayed.

Figure 7C:
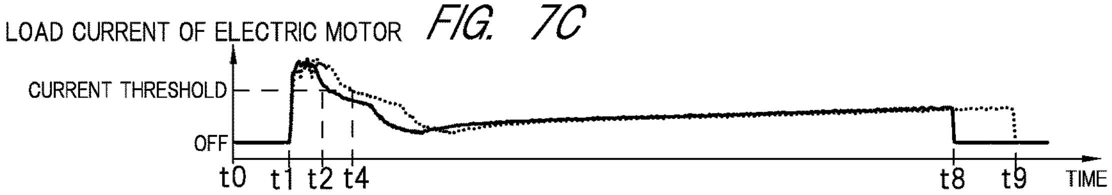
Figure 7D:
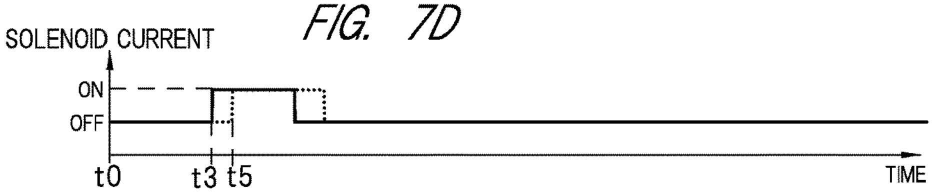
Figure 7E:
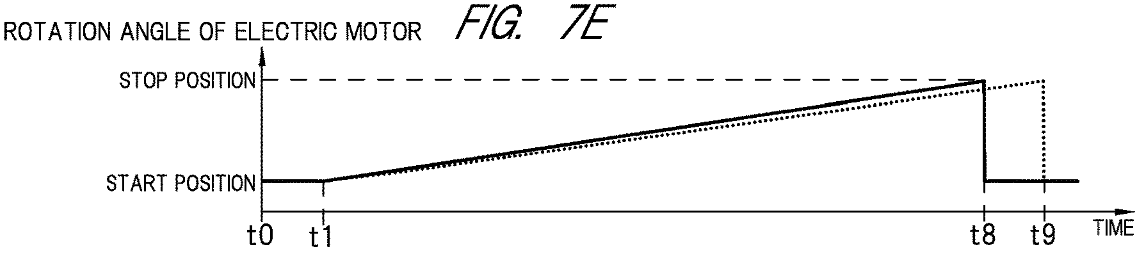
Figure 7F:
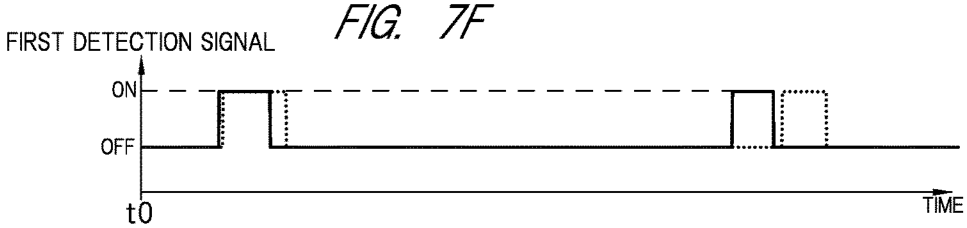
Figure 7G:

As shown in FIG. 7C, the time when the load current of the electric motor 15 falls below the current threshold after power supply to the electric motor 15 is started at time t1 is time t2 when the temperature is low, while it is time t4 when the temperature is high. Therefore, when the temperature is low, the control unit 73 causes the power supply unit 14 to start supplying current to the solenoid 60 at time t3 (see FIG. 7D), and the feeder unit 62 starts to move from the initial position (see FIG. 7B). On the other hand, when the temperature is high, the control unit 73 causes the power supply unit 14 to start supplying current to the solenoid 60 at time t5 (see FIG. 7D), and the feeder unit 62 starts to move from the initial position (see FIG. 7B). After the nail 55 is driven, the control unit 73 can stop the power supply to the electric motor 15 at time t8 when the temperature is low, but it stops the power supply to the electric motor 15 at time t9 when the temperature is high (see FIG. 7C).

As described above, the driving of the solenoid 60 is allowed when the load current of the electric motor 15 affected by the internal temperature of the housing 11 falls below the current threshold. Namely, the timing of the current supply to the solenoid 60 can be controlled in accordance with the internal temperature of the housing 11. Therefore, when the internal temperature of the housing 11 is low, it is possible to speed up the response from the operation for driving the nail 55 to the completion of the driving of the nail 55.

The first embodiment described above can be modified as follows.

First Modification

The working tool 10 according to the first modification has the same configuration as the working tool 10 according to the first embodiment described above. The working tool 10 according to the first modification is different from the working tool 10 according to the first embodiment in that different current threshold is set for the load current of the electric motor 15 in accordance with the power capacity (remaining battery level) of the power supply unit 14 and the timing of supplying the current to the solenoid 60 is changed.

FIG. 8A to FIG. 8G are timing charts in the case where the working tool 10 according to the first modification drives the single nail 55 into the workpiece W1. FIG. 8A to FIG. 8G show the relationship between the position of the driver blade 30 and the time, the relationship between the position of the feeder unit 62 in the second direction and the time, the relationship between the load current of the electric motor 15 and the time, the relationship between the current value supplied to the solenoid 60 and the time, the relationship between the rotation angle of the electric motor 15 and the time, the relationship between the output of the first detection signal and the time, and the relationship between the output of the second detection signal and the time, respectively. In addition, in FIG. 8A to FIG. 8G, the solid line indicates the case where the remaining battery level is high, and the dashed line indicates the case where the remaining battery level is low.

When the remaining battery level decreases, the electric power supplied to the electric motor 15 decreases. Since the electric power itself supplied to the electric motor 15 decreases when the remaining battery level is low, the load current falls below the current threshold in the first embodiment (hereinafter, referred to as the first current threshold) even if the electromotive force becomes large like when the electric motor 15 starts rotating. Therefore, when the remaining battery level is low, the control unit 73 sets a second current threshold smaller than the first current threshold.

Figure 8A:
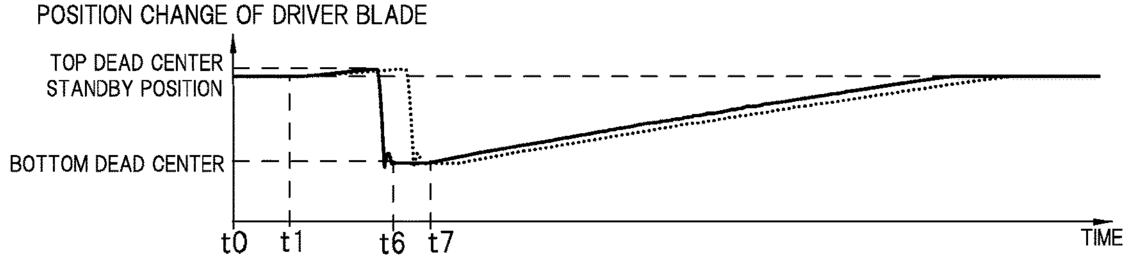
FIG. 8A to FIG. 8G are timing charts for describing an operation of a working tool according to the first modification.
Figure 8B:
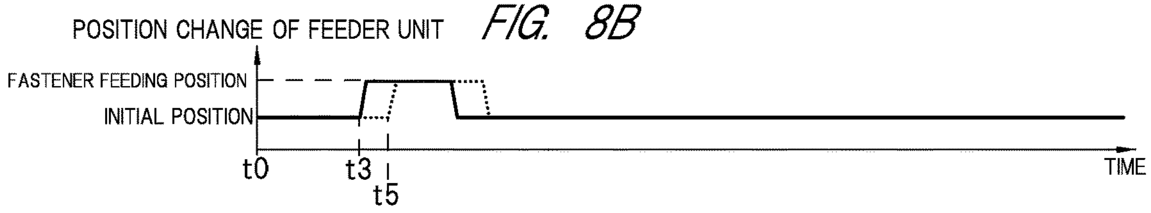
Figure 8C:
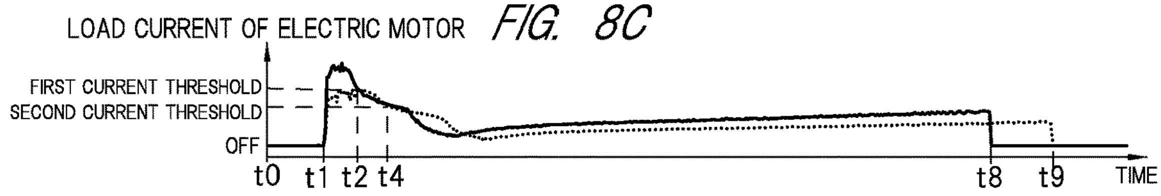
Figure 8D:
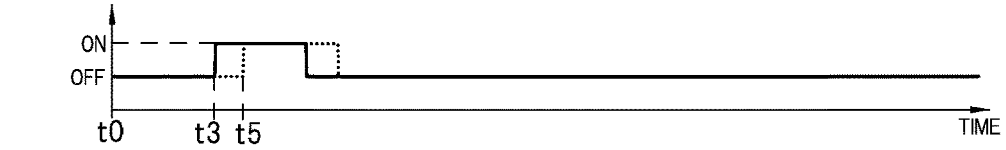
Figure 8E:
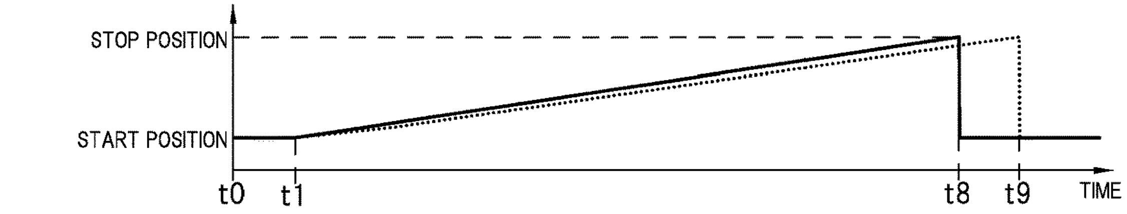
Figure 8F:
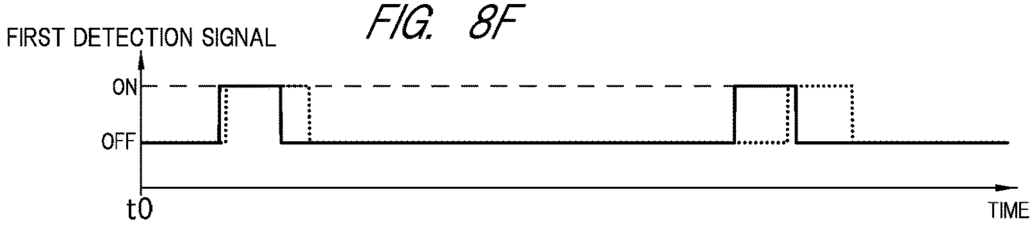
Figure 8G:

As shown in FIG. 8C, after power supply to the electric motor 15 is started at time t1, the load current of the electric motor 15 falls below the first current threshold at time t2 when the remaining battery level is high, but it falls below the second current threshold at time t4 when the remaining battery charge is low. Therefore, when the remaining battery level is high, the control unit 73 causes the power supply unit 14 to start supplying current to the solenoid 60 at time t3 (see FIG. 8D), and the feeder unit 62 starts to move from the initial position (see FIG. 8B). On the other hand, when the remaining battery level is low, the control unit 73 causes the power supply unit 14 to start supplying current to the solenoid 60 at time t5 (see FIG. 8D), and the feeder unit 62 starts to move from the initial position (see FIG. 8B).

As described above, since the time period required until the feeder unit 62 starts to move from the initial position is long when the remaining battery level is low, the time period required after the first operation signal and the second operation signal are output until the driver blade 30 ascends to the top dead center, descends to strike the nail 55, and reaches the bottom dead center to stop there increases. As shown in FIG. 8A, the driver blade 30 reaches the bottom dead center at time t6 when the remaining battery level is high, but it reaches the bottom dead center at time t7 when the remaining battery level is low. Namely, when the remaining battery level is low, the response from the operation for driving the nail 55 to the completion of the driving of the nail 55 is delayed.

After the nail 55 is driven, the control unit 73 can stop the power supply to the electric motor 15 at time t8 when the remaining battery level is high, but it stops the power supply to the electric motor 15 at time t9 when the remaining battery level is low (see FIG. 8C).

As described above, the driving of the solenoid 60 is allowed when the load current of the electric motor 15 affected by the remaining battery level falls below the current threshold. Therefore, when the remaining battery level of the power supply unit 14 is high, it is possible to speed up the response from the operation for driving the nail 55 to the completion of the driving of the nail 55.

Second Embodiment

A working tool according to the second embodiment will be described with reference to FIG. 9A to FIG. 9F. In the following description, the same components as those of the first embodiment are denoted by the same reference characters and differences are mainly described. Points that are not particularly described are the same as those in the first embodiment. The working tool 10 according to the second embodiment includes a feeding mechanism 19A having a configuration different from that of the first embodiment, so that the timing of supplying current to the feeding mechanism 19A is different from that of the first embodiment.

Figures 9A, 9B, 9C, 9D, 9E, 9F:
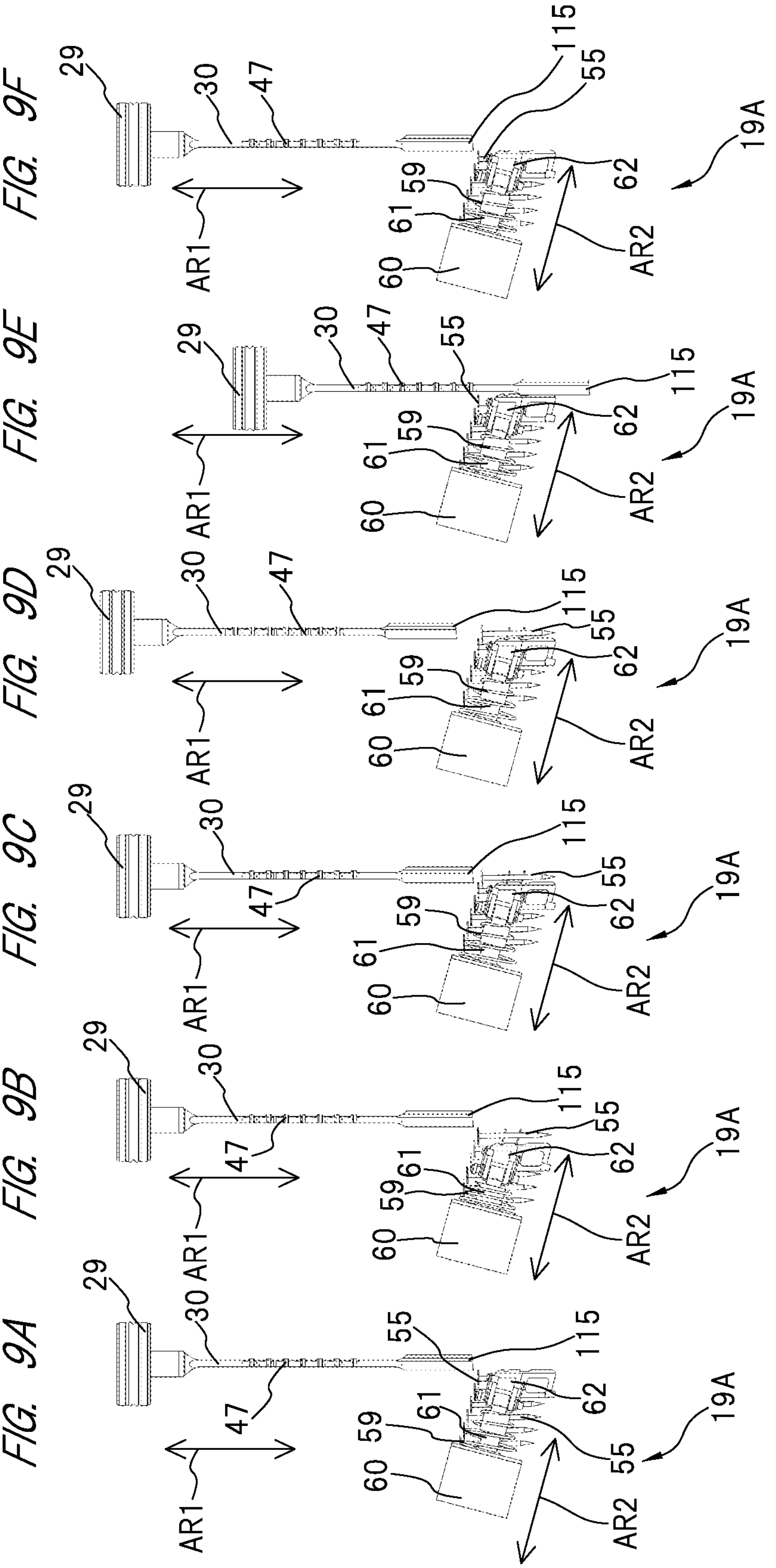
FIG. 9A to FIG. 9F are diagrams for describing an operation of a feeding mechanism in the second embodiment.

FIG. 9A to FIG. 9F are diagrams each showing the feeding mechanism 19A, the piston 29, and the driver blade 30, similarly to FIG. 4A to FIG. 4F described above, and the driver blade 30 is located at the standby position in FIG. 9A. The feeding mechanism 19A has the spring 59, the solenoid 60, the iron core 61, and the feeder unit 62. In the feeding mechanism 19A, unlike the first embodiment, the spring 59 biases the iron core 61 to the initial position on one side (front side) in the second direction.

Fastener Feeding Operation

When current is supplied to the coil of the solenoid 60 from the power supply unit 14, the iron core 61 moves from the initial position to the other side (rear side) in the second direction AR2 by the generated magnetic attractive force against the biasing force of the spring 59. Along with the movement of the iron core 61, the feeder unit 62 also moves from the initial position to a predetermined position on the other side in the second direction AR2 (hereinafter referred to as a nail mounting position) (see FIG. 9B). At the time of starting this movement, the feed pawl (not shown) provided in the feeder unit 62 does not enter between the plurality of nails 55 connected by the connecting element. Therefore, the plurality of nails 55 are not moved to the other side in the second direction AR2. When the feeder unit 62 reaches the nail mounting position, the feed pawl provided in the feeder unit 62 enters between the nails 55 connected by the connecting element.

Thereafter, when the current supply to the solenoid 60 by the power supply unit 14 is terminated, the coil cancels the magnetic attractive force. Consequently, the iron core 61 is returned from the nail mounting position to the initial position on one side in the second direction AR2 by the biasing force of the spring 59. Along with this movement of the iron core 61, the feeder unit 62 also moves from the nail mounting position to the initial position on one side in the second direction AR2. When the feeder unit 62 moves to one side in the second direction AR2, the nail 55 is sent to the ejection unit 32 on one side in the second direction AR2 by the feed pawl that moves together with the feeder unit 62. In this way, the feeder unit 62 locates the nail 55 located at the head of the connecting element among the nails 55 stored in the magazine unit 54 at the fastener feeding position on the lower side of the driver blade 30 (see FIG. 9C).

When the electric power output from the power supply unit 14 is supplied to the electric motor 15 in the state where the nail 55 is located at the fastener feeding position, the conversion mechanism 17 is rotated by the driving force of the electric motor 15 in the state of being engaged with the driver blade 30, thereby lifting the driver blade 30 upward in the first direction AR1. As a result, as shown in FIG. 9D, the driver blade 30 reaches the top dead center on the upper side in the first direction AR1 compared to the states in FIG. 9A to FIG. 9C. When the pinwheel 46 rotates further from this state and all the pinion pins 48 are released from the racks 47, the driver blade 30 descends by the pressure of the pressure chamber 27 and strikes the nail 55 located at the fastener feeding position. As a result, the nail 55 is driven into the workpiece W1, and the driver blade 30 reaches the bottom dead center on the lower side in the first direction AR1 compared to the states of FIG. 9A to FIG. 9D and stops descending (see FIG. 9E).

Thereafter, the pin wheel 46 is rotated by the rotation of the electric motor 15, and the pinion pin 48 and the rack 47 are engaged again. Then, the driver blade 30 moves to the standby position on the upper side in the first direction AR1 (see FIG. 9F).

Operation Timing

The operation timing of the working tool 10 will be described with reference to FIG. 10A to FIG. 10G. FIG. 10A to FIG. 10G are timing charts in the case where the single nail 55 is driven into the workpiece W1. FIG. 10A to FIG. 10G show the relationship between the position of the driver blade 30 and the time, the relationship between the position of the feeder unit 62 and the time, the relationship between the load current of the electric motor 15 and the time, the relationship between the current value supplied to the solenoid 60 and the time, the relationship between the rotation angle of the electric motor 15 and the time, the relationship between the output of the first detection signal and the time, and the relationship between the output of the second detection signal and the time, respectively.

Figure 10A:
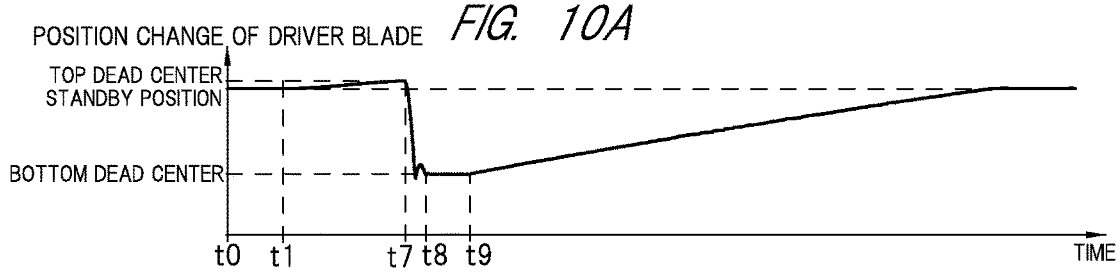
FIG. 10A to FIG. 10G are timing charts for describing an operation of a working tool according to the second embodiment.
Figure 10B:
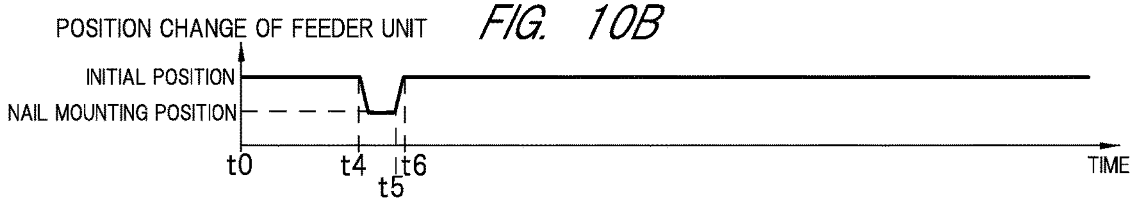
Figure 10C:
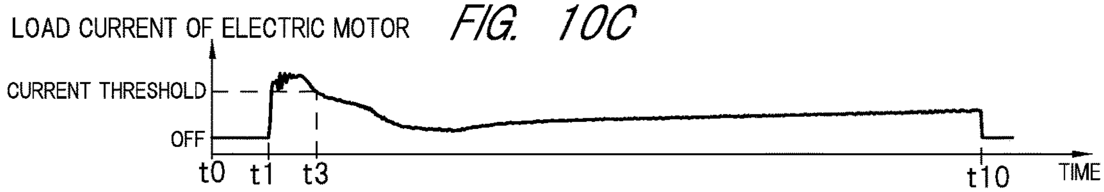
Figure 10D:
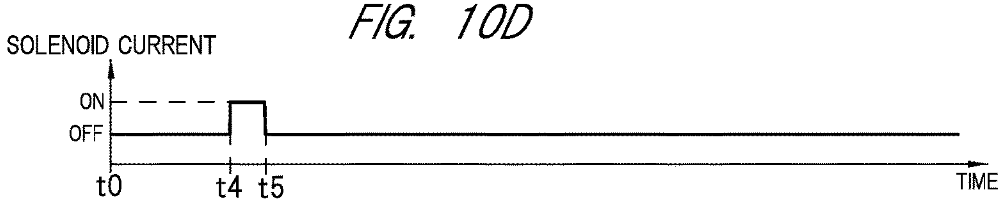
Figure 10E:
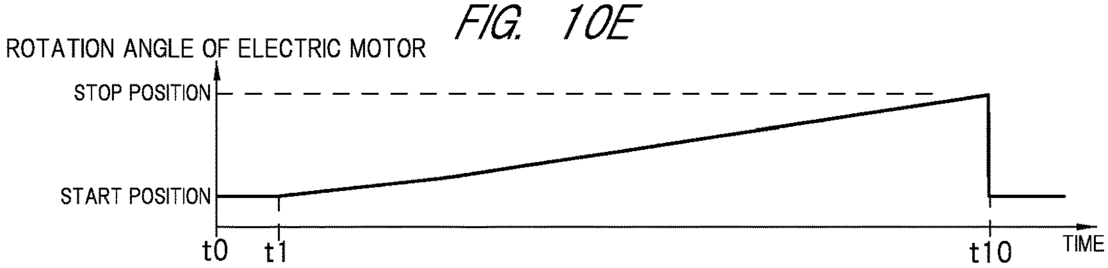
Figure 10F:
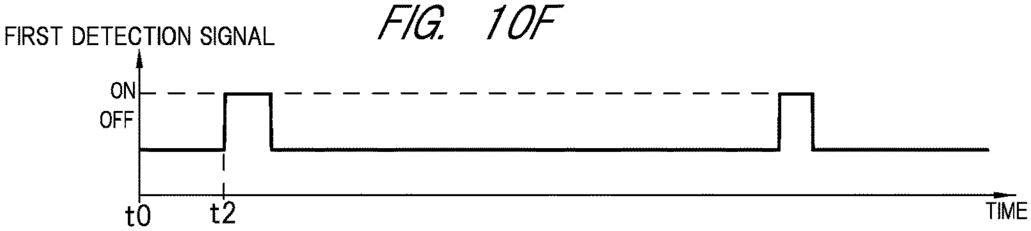
Figure 10G:

The operation of each unit from time t1 to time t3 shown in FIG. 10A to FIG. 10G is the same as the operation from time t1 to time t3 shown in FIG. 5A to FIG. 5G described in the first embodiment. After time t3 shown in FIG. 10C, the value of the load current falls below a preset current threshold. Then, as shown in FIG. 10D, the control unit 73 causes the power supply unit 14 to start supplying current to the solenoid 60 at time t4. Consequently, the feeder unit 62 moves to the nail mounting position on the other side (rear side) in the second direction AR2, and the feed pawl of the feeder unit 62 enters between the nails 55.

As shown in FIG. 10D, the control unit 73 causes the power supply unit 14 to stop supplying current to the solenoid 60 at time t5. Consequently, as shown in FIG. 10B, the feeder unit 62 moves to one side in the second direction AR2 and the nail 55 is located at the fastener feeding position at time t6. The operation of each unit after time t7 is the same as the operation after time t6 in FIG. 5A to FIG. 5G described in the first embodiment.

According to the second embodiment described above, the same effects as those obtained by the first embodiment can be obtained.

Third Embodiment

A working tool according to the third embodiment will be described with reference to FIG. 11A to FIG. 11F. In the following description, the same components as those of the first embodiment are denoted by the same reference characters and differences are mainly described. Points that are not particularly described are the same as those in the first embodiment. The working tool 10 according to the third embodiment includes a feeding mechanism 19B having a configuration different from that of the first embodiment, so that the timing of supplying current to the feeding mechanism 19B is different from that of the first embodiment.

Feeding Mechanism 19B

Figures 11A, 11B, 11C, 11D, 11E, 11F:
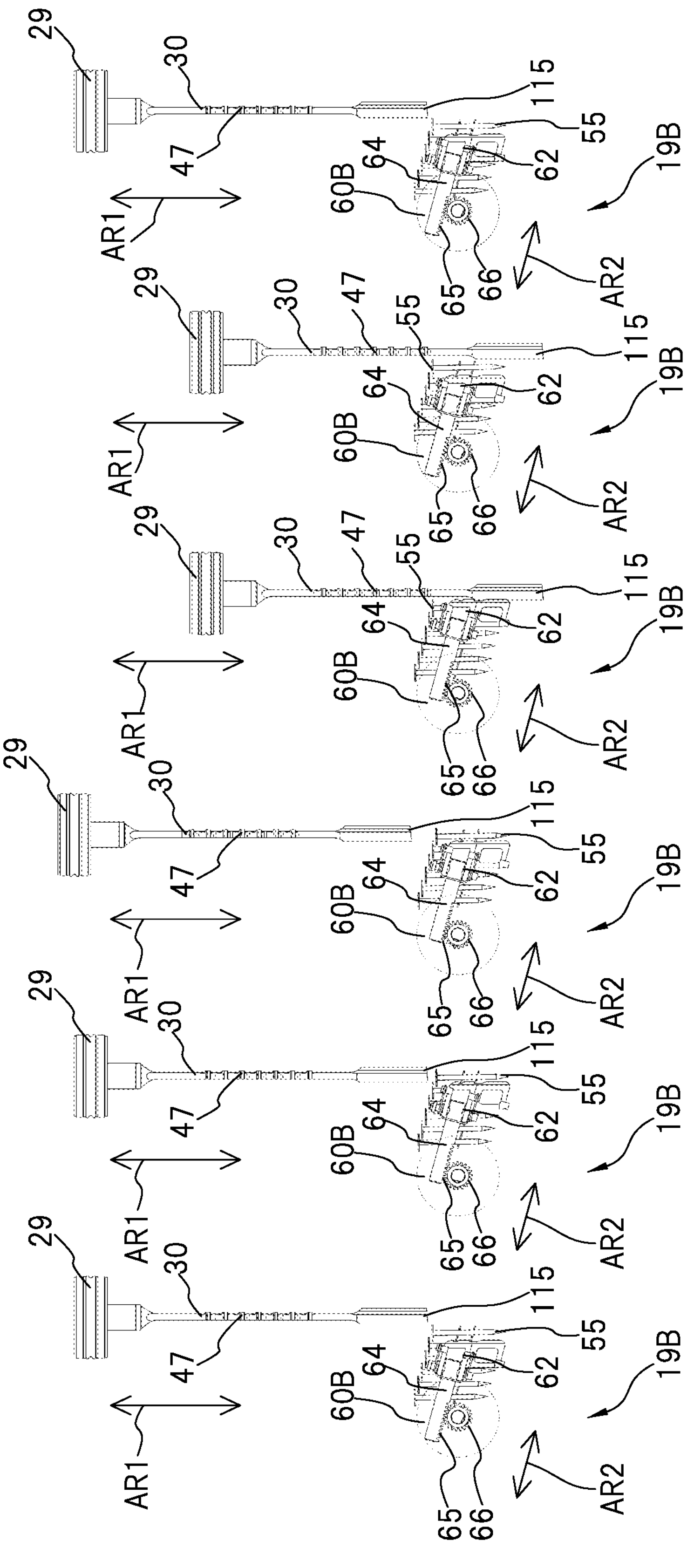
FIG. 11A to FIG. 11F are diagrams for describing an operation of a feeding mechanism in the third embodiment.

FIG. 11A to FIG. 11F are diagrams each showing the feeding mechanism 19B, the piston 29, and the driver blade 30, similarly to FIG. 4A to FIG. 4F shown in the first embodiment. FIG. 11A shows the case where the driver blade 30 is located at the standby position. The feeding mechanism 19B includes a rotary solenoid 60B, the feeder unit 62, a feeder rod 64, a rack 65, and a pinion 66. The rotary solenoid 60B has a rotation shaft, a coil, and a permanent magnet. The rotation shaft of the rotary solenoid 60B extends in a direction orthogonal to the second direction, and the coil is arranged around this rotation shaft. When current is supplied to the coil from the power supply unit 14, the coil generates magnetic force. By the attractive and repulsive action between this magnetic force and the permanent magnet, the rotation shaft rotates clockwise or counterclockwise on the page of FIG. 11 within a predetermined angular range.

The feeder rod 64 is a plate-like member extending along the second direction AR2. In a part of the feeder rod 64 on the other side (rear side) in the second direction AR2, the rack (gear) 65 is formed along the extending direction of the feeder rod 64 on one side (lower side) of the feeder rod 64 in the first direction AR1.

The pinion (gear) 66 is provided on the rotation shaft of the rotary solenoid 60B and meshes with the rack 65 of the feeder rod 64. When a current is supplied to the rotary solenoid 60B and the rotation shaft is rotated, the pinion 66 is also rotated together. Along with the rotation of the pinion 66, the rack 65 meshing with the pinion 66 moves to one side or the other side along the second direction AR2. As a result, the feeder rod 64 moves along the second direction AR2 by the current supply to the rotary solenoid 60B. The feeder unit 62 is attached to the feeder rod 64 on one side (front side) in the second direction AR2, and the feeder unit 62 moves along with the movement of the feeder rod 64.

Fastener Feeding Operation

When current is supplied from the power supply unit 14 to the coil of the rotary solenoid 60B, the pinion 66 rotates clockwise (hereinafter referred to also as forward rotation) on the page of the drawing as shown in FIG. 11B. The rotational force of the pinion 66 is transmitted to the feeder rod 64 via the rack 65, and the feeder rod 64 moves to one side (front side) in the second direction AR2. Consequently, the feeder unit 62 moves from the initial position shown in FIG. 11A to one side in the second direction AR2, and the nail 55 moves to the fastener feeding position on the lower side of the driver blade 30 as shown in FIG. 11B.

When the electric power output from the power supply unit 14 is supplied to the electric motor 15 in the state where the nail 55 is located at the fastener feeding position, the driver blade 30 ascends upward in the first direction AR1 and reaches the top dead center as shown in FIG. 11C as in the case of the first and second embodiments.

Thereafter, the driver blade 30 descends and strikes the nail 55 located at the fastener feeding position as in the case of the first and second embodiments. As shown in FIG. 11D, after striking the nail 55, the driver blade 30 reaches the bottom dead center and stops descending.

When the driver blade 30 stops at the bottom dead center, the power supply unit 14 supplies current to the rotary solenoid 60B to rotate the pinion 66 shown in FIG. 11E counterclockwise (hereinafter referred to also as backward rotation) on the page of the drawing. The rotational force of the pinion 66 is transmitted to the feeder rod 64 via the rack 65, and the feeder rod 64 moves to the other side (rear side) in the second direction AR2. Consequently, the feeder unit 62 moves to the initial position. When the feeder unit 62 moves to the initial position, the feed pawl (not shown) that moves together with the feeder unit 62 enters between the nails 55 connected by the connecting element. Thereafter, as in the case of the first and second embodiments, the driver blade 30 is moved to the standby position on the upper side in the first direction AR1 by the rotation of the electric motor 15 as shown in FIG. 11F.

Operation Timing

The operation timing of the working tool 10 will be described with reference to FIG. 12A to FIG. 12G. FIG. 12A to FIG. 12G are timing charts in the case where the single nail 55 is driven into the workpiece W1. FIG. 12A to FIG. 12G show the relationship between the position of the driver blade 30 and the time, the relationship between the position of the feeder unit 62 and the time, the relationship between the load current of the electric motor 15 and the time, the relationship between the current value supplied to the rotary solenoid 60B and the time, the relationship between the rotation angle of the electric motor 15 and the time, the relationship between the output of the first detection signal and the time, and the relationship between the output of the second detection signal and the time, respectively.

Figure 12A:
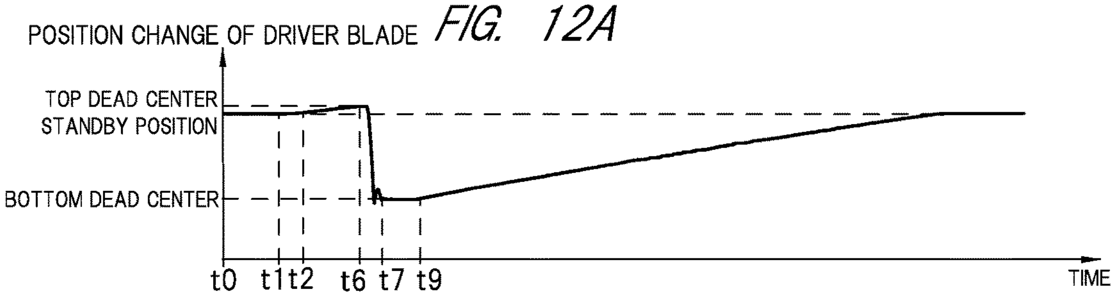
FIG. 12A to FIG. 12G are timing charts for describing an operation of a working tool according to the third embodiment.
Figure 12B:
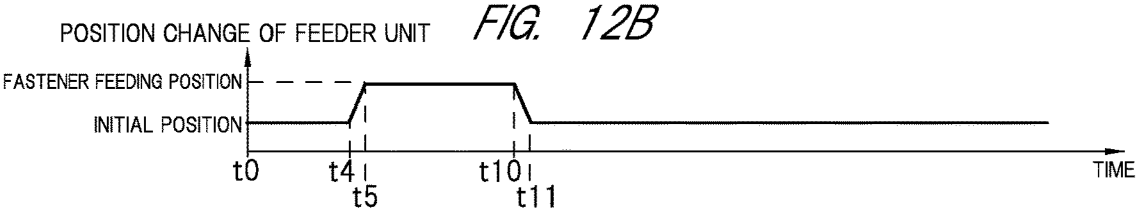
Figure 12C:
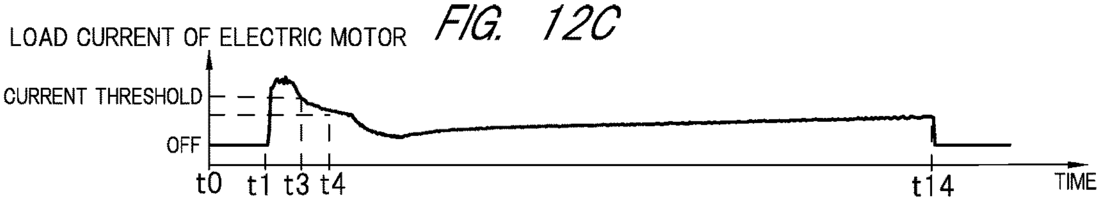
Figure 12D:
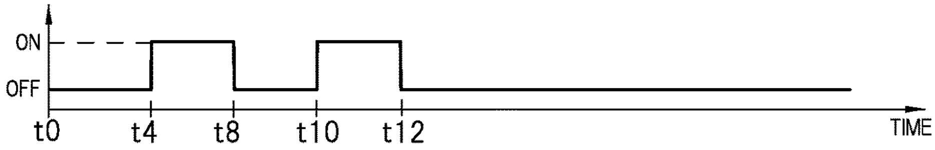
Figure 12E:
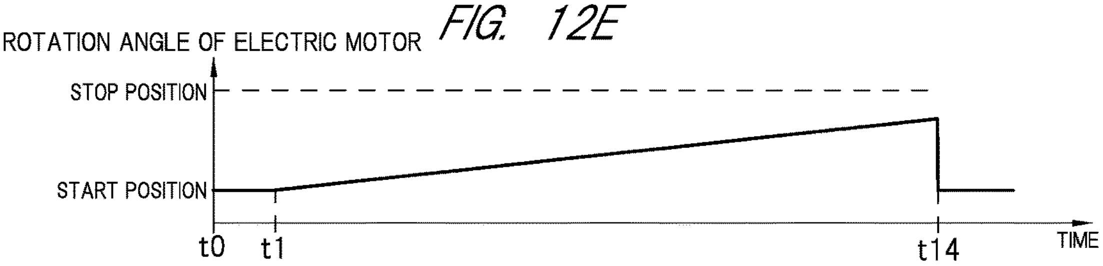
Figure 12F:
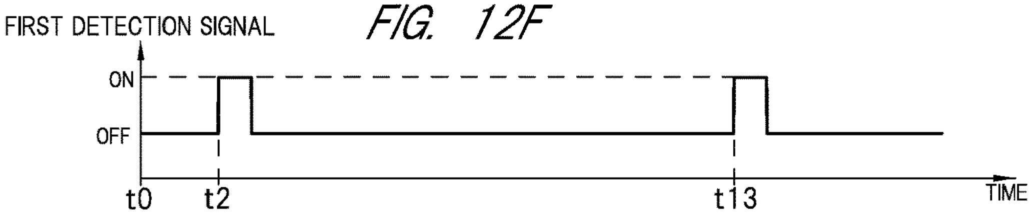
Figure 12G:
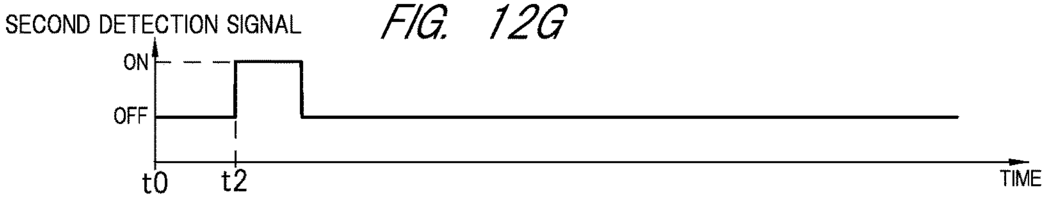

The operation of each unit from time t1 to time t3 shown in FIG. 12A to FIG. 12G is the same as the operation from time t1 to time t3 shown in FIG. 5A to FIG. 5G described in the first embodiment. After time t3, the value of the load current of the electric motor 15 falls below a preset current threshold as shown in FIG. 12C. Then, as shown in FIG. 12D, the control unit 73 causes the power supply unit 14 to start supplying current to the rotary solenoid 60B at time t4. Consequently, as shown in FIG. 12B, the feeder unit 62 starts to move to one side (front side) in the second direction AR2 by the rotary solenoid 60B rotating forward. At time t5, the nail 55 is moved to the fastener feeding position shown in FIG. 11B by the feeder unit 62 that has moved to one side in the second direction AR2 as shown in FIG. 12B.

Thereafter, as shown in FIG. 12A, the driver blade 30 that has reached the top dead center at time t6 descends, and reaches the bottom dead center to stop there at time t7. As shown in FIG. 12D, at time t8 after the driver blade 30 stops at the bottom dead center, the control unit 73 causes the power supply unit 14 to stop supplying current to the rotary solenoid 60B.

Along with the rotation of the electric motor 15, the driver blade 30 starts to ascend at time t9 as shown in FIG. 12A. Thereafter, as shown in FIG. 12D, the control unit 73 causes the power supply unit 14 to start supplying current to the rotary solenoid 60B at time t10. Consequently, as shown in FIG. 12B, the feeder unit 62 starts to move to the other side (rear side) in the second direction AR2 by the rotary solenoid 60B rotating backward. Then, the feeder unit 62 reaches the initial position at time t11. At time t12 after the feeder unit 62 has moved to the initial position, the control unit 73 causes the power supply unit 14 to stop supplying current to the rotary solenoid 60B. The operation of each unit after time t11 is the same as the operation after time t6 in FIG. 5A to FIG. 5G described in the first embodiment.

According to the third embodiment described above, the same effects as those obtained by the first embodiment can be obtained.

Fourth Embodiment

A working tool according to the fourth embodiment will be described with reference to FIG. 13A to FIG. 13F. In the following description, the same components as those of the second embodiment are denoted by the same reference characters and differences are mainly described. Points that are not particularly described are the same as those in the second embodiment. The working tool 10 according to the fourth embodiment includes the feeding mechanism 19A similar to that of the second embodiment, but the timing of moving the nail to the fastener feeding position is different from that of the second embodiment.

As the fourth embodiment, the working tool 10 having the feeding mechanism 19A similar to that of the second embodiment will be described, but the working tool 10 having the feeding mechanism 19 of the first embodiment or the feeding mechanism 19B of the third embodiment may perform the operations described below.

Fastener Feeding Operation

Figures 13A, 13B, 13C, 13D, 13E, 13F:
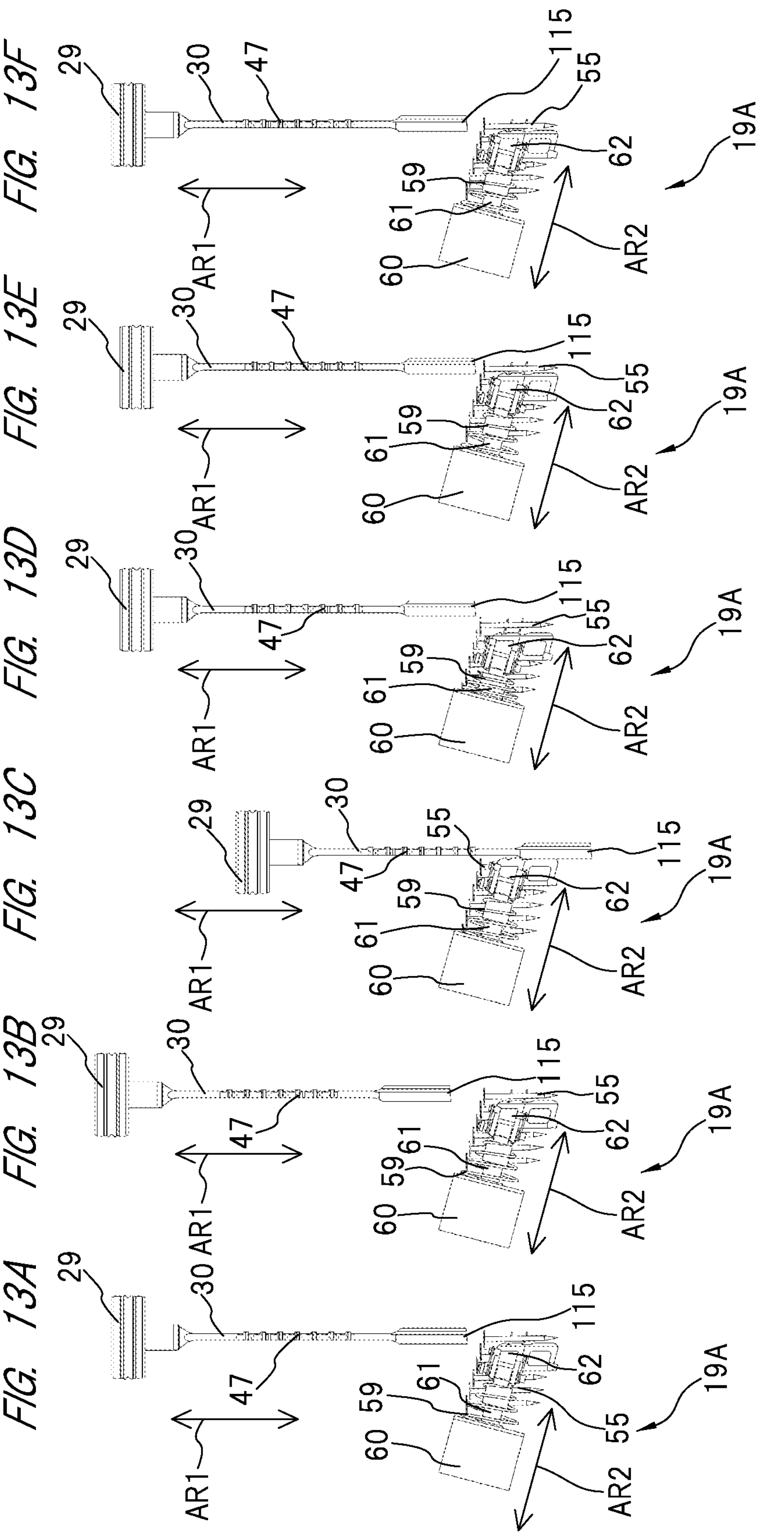
FIG. 13A to FIG. 13F are diagrams for describing an operation of a feeding mechanism in the fourth embodiment.

FIG. 13A is a diagram showing the feeding mechanism 19A, the piston 29, and the driver blade 30 similarly to FIG. 9A described above, and the driver blade 30 is located at the standby position. However, unlike the case of FIG. 9A, the nail 55 has already been located at the fastener feeding position.

When the electric power output from the power supply unit 14 is supplied to the electric motor 15 in the state where the nail 55 is located at the fastener feeding position, the driver blade 30 ascends and reaches the top dead center as shown in FIG. 13B. When the pinwheel 46 rotates further from this state, the driver blade 30 descends to strike the nail 55 located at the fastener feeding position, and then reaches the bottom dead center to stop descending as shown in FIG. 13C.

Thereafter, the driver blade 30 moves upward in the first direction AR1 again. As shown in FIG. 13D, when the tip 115 of the driver blade 30 reaches a position on the upper side than the upper portion (head) of the nail 55, current is supplied to the coil of the solenoid 60 by the power supply unit 14. Consequently, as described with reference to FIG. 9B in the second embodiment, the feeder unit 62 moves from the initial position to the nail mounting position on the other side (rear side) in the second direction AR2 against the biasing force of the spring 59.

At the nail mounting position, as in the case of the second embodiment, the feed pawl provided in the feeder unit 62 enters between the nails 55 connected by the connecting element. Thereafter, when the current supply to the solenoid 60 by the power supply unit 14 is terminated, the feeder unit 62 is returned from the nail mounting position to the initial position on one side in the second direction AR2 by the biasing force of the spring 59 as described with reference to FIG. 9C in the second embodiment. When the feeder unit 62 moves to one side in the second direction AR2, the nail 55 located at the head of the connecting element among the nails 55 stored in the magazine unit 54 is located at the fastener feeding position as shown in FIG. 13E. Thereafter, the driver blade 30 moves to the standby position on the upper side in the first direction AR1 by the rotation of the electric motor 15 as shown in FIG. 13F.

Operation Timing

The operation timing of the working tool 10 will be described with reference to the drawings. FIG. 14A to FIG. 14G are timing charts in the case where the single nail 55 is driven into the workpiece W1. FIG. 14A to FIG. 14G show the relationship between the position of the driver blade 30 and the time, the relationship between the position of the feeder unit 62 and the time, the relationship between the load current of the electric motor 15 and the time, the relationship between the current value supplied to the solenoid 60 and the time, the relationship between the rotation angle of the electric motor 15 and the time, the relationship between the output of the first detection signal and the time, and the relationship between the output of the second detection signal and the time, respectively.

Figure 14A:
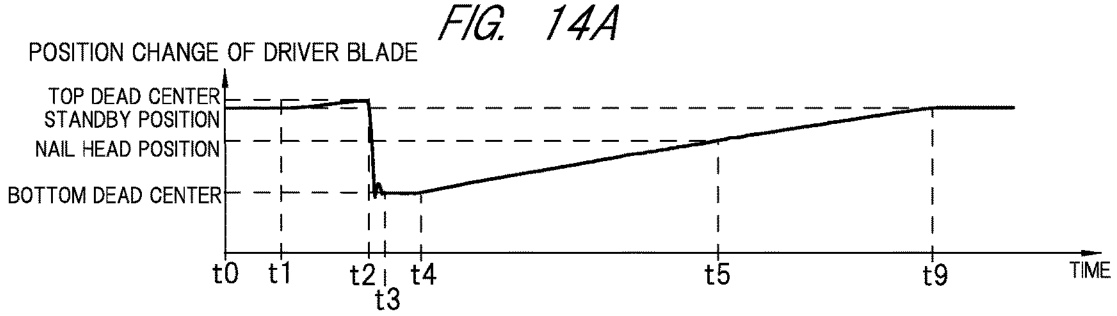
FIG. 14A to FIG. 14G are timing charts for describing an operation of a working tool according to the fourth embodiment.
Figure 14B:
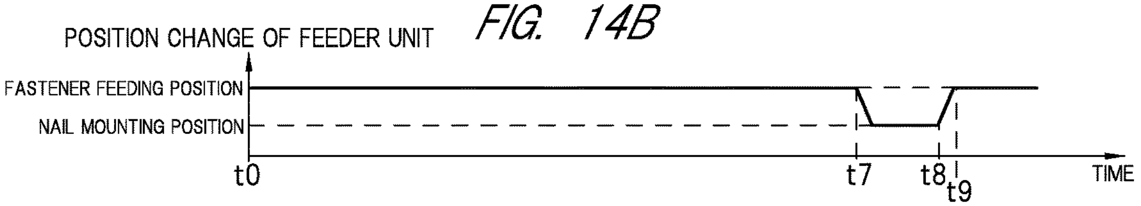
Figure 14C:
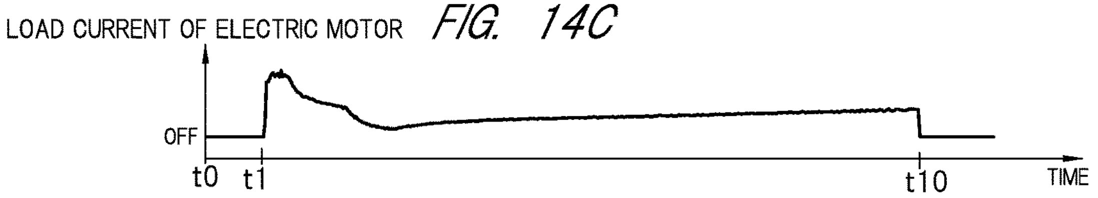

In the fourth embodiment, unlike FIG. 10B, the nail 55 has already been located at the fastener feeding position by the feeder unit 62 at time t0 (that is, before the first and second operation signals are output) as shown in FIG. 14B. When the first operation signal and the second operation signal are output in this state, the control unit 73 causes the power supply unit 14 to start supplying current to the electric motor 15 at time t1 as shown in FIG. 14C. Thereafter, the load current of the electric motor 15 changes in the same manner as in the case of the second embodiment shown in FIG. 10C.

Thereafter, as shown in FIG. 14A, the driver blade 30 that has reached the top dead center at time t2 descends, and reaches the bottom dead center to stop there at time t3. After reaching the bottom dead center, the driver blade 30 starts to ascend at time t4, and reaches a position on the upper side than the head of the nail 55 (nail head position) at time t5. As shown in FIG. 14F and FIG. 14G, the first detection signal is output from the pinwheel position detection sensor 58 and the second detection signal is output from the blade position detection sensor 77 at time t6.

Figure 14D:
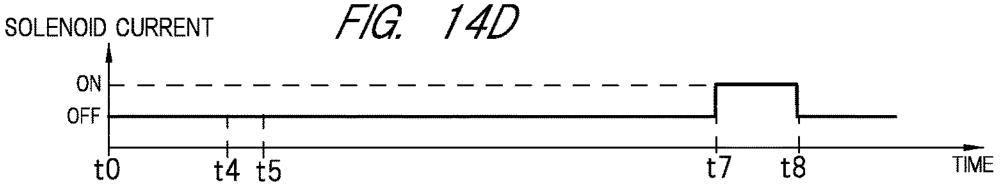
Figure 14E:
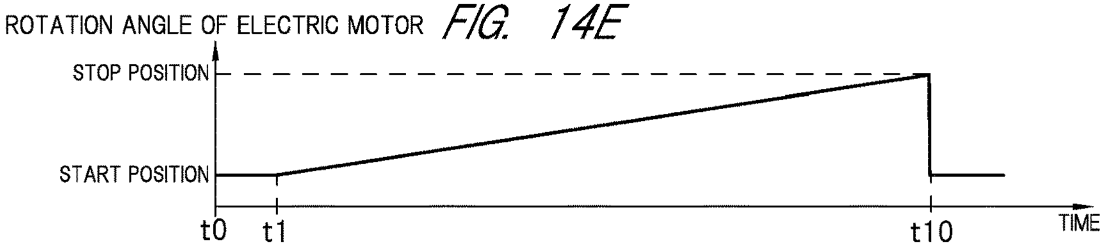
Figure 14F:
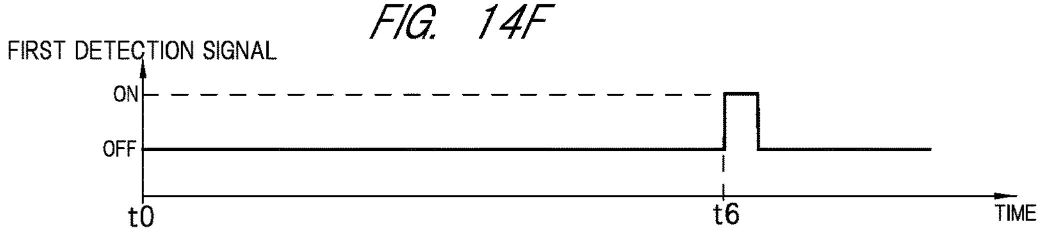
Figure 14G:
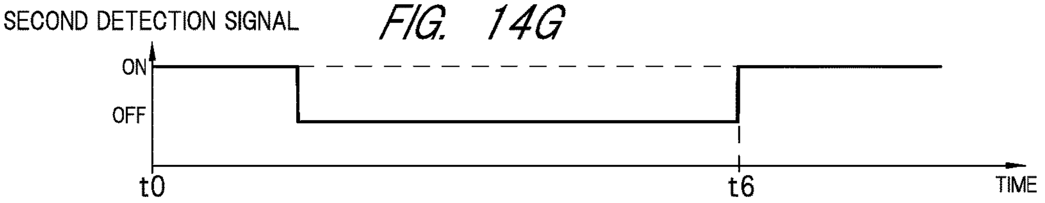
Figure 15A:
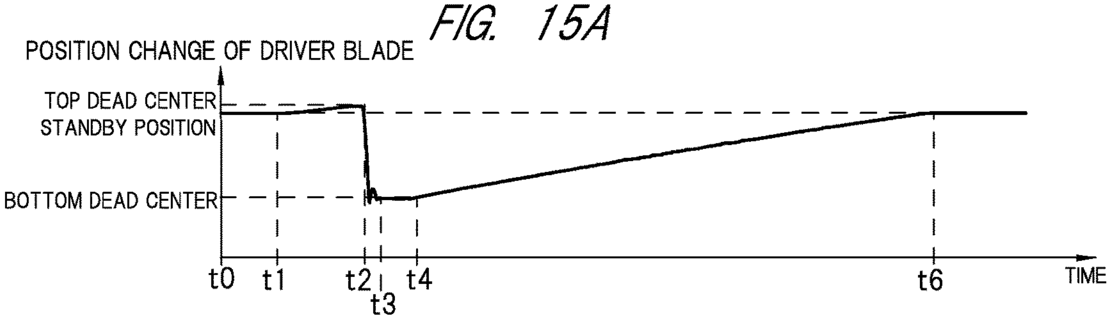
FIG. 15A to FIG. 15G are timing charts for describing an operation of a working tool according to the second modification.
Figure 15B:
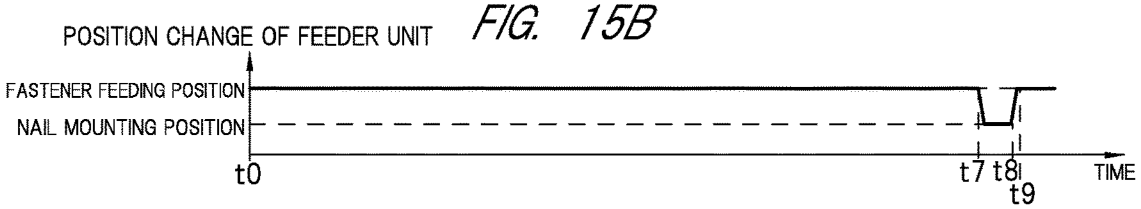
Figure 15C:
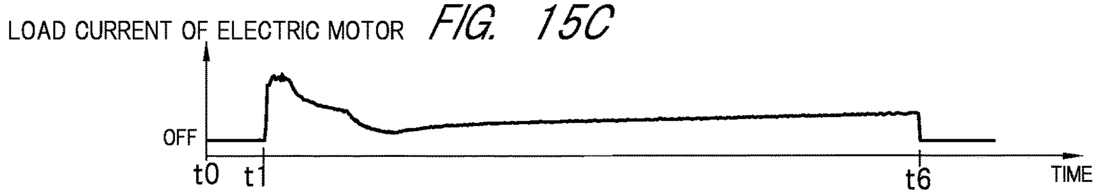
Figure 15D:
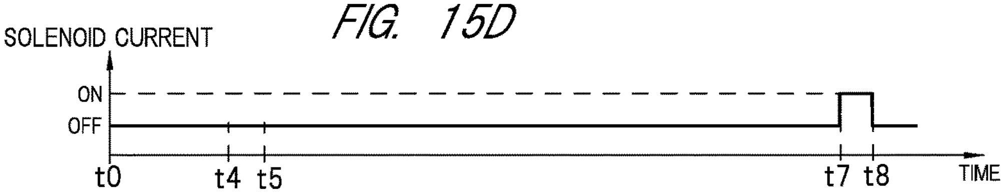
Figure 15E:
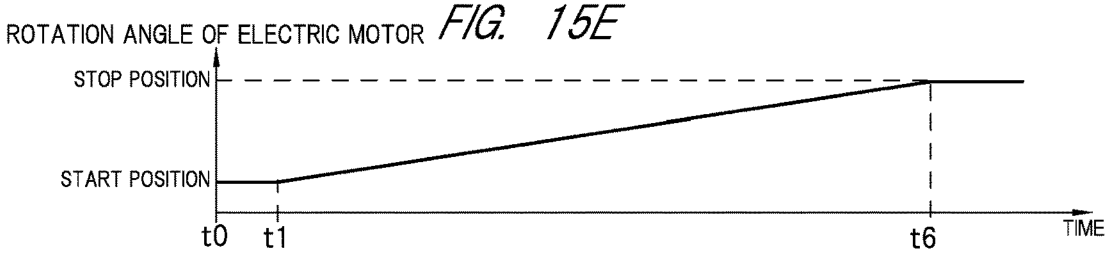
Figure 15F:
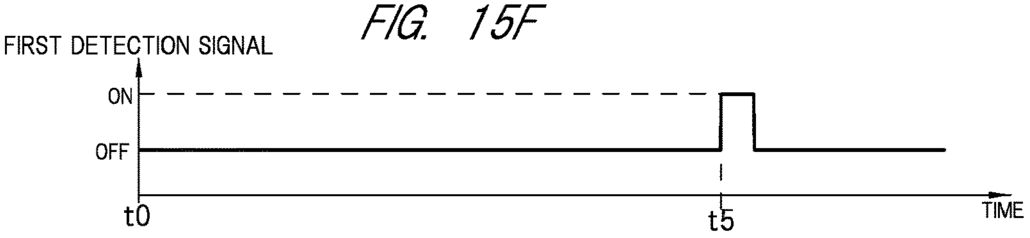
Figure 15G:
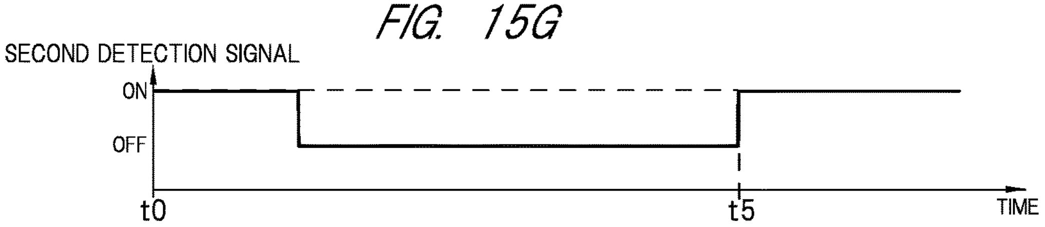

Thereafter, at time t7, the control unit 73 causes the power supply unit 14 to start supplying current to the solenoid 60, thereby moving the feeder unit 62 to the nail mounting position as shown in FIG. 14D. At time t8 after the feed pawl of the feeder unit 62 enters between the nails 55, the control unit 73 causes the power supply unit 14 to stop supplying current to the solenoid 60 as shown in FIG. 14D. Consequently, as shown in FIG. 14B, the feeder unit 62 starts to move to one side (front side) in the second direction AR2 from the nail mounting position at time t8, and the nail 55 is located at the fastener feeding position at time t9.

As shown in FIG. 14A, the driver blade 30 reaches the standby position at time t9. Thereafter, at time t10, the control unit 73 causes the power supply unit 14 to stop supplying electric power to the electric motor 15 as shown in FIG. 14C. Namely, after the nail 55 is struck, the working tool 10 locates the next nail 55 at the fastener feeding position, and stops the power supply to the electric motor 15 after the driver blade 30 reaches the standby position.

According to the fourth embodiment described above, the following effect can be obtained.

The feeder unit 62 feeds the nail 55 to the ejection unit 32 while the driver blade 30 moves from the bottom dead center to the standby position, specifically, before the driver blade 30 reaches the standby position. Consequently, since the next nail 55 can be fed in advance, the time period from when the operation of driving the next nail 55 is performed to when the nail 55 is actually driven into the workpiece W1 can be shortened.

Second Modification

The working tool 10 according to the second modification has the same configuration as that of the working tool 10 according to the fourth embodiment. The working tool 10 according to the second modification is different from the working tool 10 according to the fourth embodiment in that the next nail 55 is moved to the fastener feeding position after stopping the power supply to the electric motor 15. The power supply operation of the working tool 10 in this case will be described with reference to FIG. 15A to FIG. 15G.

FIG. 15A to FIG. 15G are timing charts in the case where the single nail 55 is driven into the workpiece W1. FIG. 15A to FIG. 15G show the relationship between the position of the driver blade 30 and the time, the relationship between the position of the feeder unit 62 and the time, the relationship between the load current of the electric motor 15 and the time, the relationship between the current value supplied to the solenoid 60 and the time, the relationship between the rotation angle of the electric motor 15 and the time, the relationship between the output of the first detection signal and the time, and the relationship between the output of the second detection signal and the time, respectively.

The operation of each unit from time t1 to time t5 shown in FIG. 15A to FIG. 15G is the same as the operation from time t1 to time t6 shown in FIG. 14A to FIG. 14G. When the driver blade 30 reaches the standby position at time t6 shown in FIG. 15A, the control unit 73 shown in FIG. 15C causes the power supply unit 14 to stop supplying electric power to the electric motor 15. The operation of each unit from time t7 to time t9 is the same as the operation from time t7 to time t9 shown in FIG. 14A to FIG. 14G. Namely, the current supply to the solenoid 60 is started after the power supply to the electric motor 15 is stopped.

The control unit 73 of the second modification drives the solenoid 60 while the driving of the electric motor 15 is stopped. Since the next nail 55 can be fed in advance, the time period from when the operation of driving the next nail 55 is performed to when the nail 55 is actually driven into the workpiece W1 can be shortened.

Although various embodiments and modifications have been described above, the present invention is not limited to these contents. Other aspects conceivable within the scope of the technical idea of the present invention are also included in the scope of the present invention.

In the above embodiments, the control unit 73 determines the load of the electric motor 15 based on the load current of the electric motor 15, but the present invention is not limited to this. The control unit 73 may determine whether the load satisfies the first condition (that is, whether the difference between the set value and the actual measured value of the rotation speed is equal to or less than the threshold) by monitoring the rotation speed of the electric motor 15 calculated from the detection value of the motor position detection sensor 78 and estimating the load torque of the electric motor 15 from the difference between the set value and the actual measured value of the rotation speed. Also, the control unit 73 may determine whether the load satisfies the first condition (that is, whether the load torque falls below the threshold) by directly measuring the load torque of the electric motor 15 by using a torque sensor such as a strain gauge. Further, the control unit 73 may determine whether the load satisfies the first condition (that is, whether the difference between the set value and the actual measured value of the moving speed is equal to or less than the threshold or whether the acceleration is equal to or less than the threshold) by providing a sensor that detects the moving speed or the acceleration of the driver blade 30 or the pinwheel 46 in the working tool 10 and estimating the load torque from the motion state of the driver blade 30. As the load of the electric motor 15 decreases, the control unit 73 may cause the power supply unit 14 to gradually increase the current of the solenoid 60.

What is claimed is:

1. A working tool comprising:

a magazine unit accommodating collated fasteners, wherein the collated fasteners are fasteners connected together and arranged in a coil;

an ejection unit to which the fasteners are fed one by one;

a striking unit operable to move in a first direction to strike one of the fasteners fed to the ejection unit;

a biasing unit configured to bias the striking unit to move in the first direction;

a lifting unit configured to be engaged with the striking unit and operable to be rotated to lift the striking unit in a second direction opposite the first direction;

a first drive unit configured to rotate the lifting unit;

a feeder unit operable to move in a third direction crossing the first and second directions and feed the fasteners stored in the magazine unit to the ejection unit one by one;

a second drive unit configured to drive the feeder unit;

an operation unit adapted to be operated by a worker to switch a driving state of the first drive unit; and a control unit configured to control the first drive unit and the second drive unit, wherein, when the operation unit is operated in a state where the striking unit is positioned at a standby position, the striking unit moves in the second direction to a top dead center, engagement of the striking unit with the lifting unit is released, the striking unit moves in the first direction to a bottom dead center by a biasing force of the biasing unit, the striking unit is engaged with the lifting unit again, and then the striking unit moves in the second direction to the standby position, and wherein the control unit includes a detection unit configured to detect a position of the striking unit, and is further configured to activate the second drive unit to drive the feeder unit in response to meeting both a first condition and a second condition, wherein the first condition is met when a load current of the first drive unit becomes below a current threshold, and wherein the second condition is met when the detection unit determines that the striking unit is positioned at a predetermined position.

2. The working tool according to claim 1, wherein the predetermined position of the second condition is located at a position beyond a fastener feeding position of the ejection unit, to which the fasteners are fed, in the second direction.

3. The working tool according to claim 1, wherein the predetermined position of the second condition is located at a position before reaching the top dead center in the second direction.

4. The working tool according to claim 1, wherein the first drive unit is a motor, wherein the detection unit includes a motor position detection unit configured to detect a rotation position of the motor, and wherein the control unit estimates the position of the striking unit based on the rotation position of the motor.

5. The working tool according to claim 1, wherein the detection unit includes a striking unit position detection unit configured to detect directly that the position of the striking unit in the first direction.

6. The working tool according to claim 1, wherein the detection unit includes a lifting unit position detection unit configured to detect a rotation position of the lifting unit, and wherein the control unit estimates the position of the striking unit based on the rotation position of the lifting unit.

7. The working tool according to claim 1, wherein the control unit is further configured to activate the second drive unit to drive the feeder unit in response to meeting a third condition in addition to the first and second conditions, and wherein the third condition is met when the striking unit moves from the bottom dead center to the standby position.

8. The working tool according to claim 1, wherein the current threshold of the first condition is set so as to be smaller than the load current flowing through the first drive unit when the striking unit starts moving from the standby position to the top dead center and to be larger than the load current flowing through the first drive unit when the striking unit moves from the bottom dead center to the standby position.

9. The working tool according to claim 8, wherein the feeder unit feeds the fasteners to the ejection unit one by one before the striking unit reaches the standby position.

10. The working tool according to claim 1, wherein the feeder unit feeds the fasteners to the ejection unit one by one while the striking unit moves from the standby position to the top dead center.

11. The working tool according to claim 1, wherein the control unit drives the second drive unit when driving of the first drive unit is stopped.

12. The working tool according to claim 1 further comprising:

a biasing member configured to bias the feeder unit to move in the third direction, wherein the second drive unit moves the feeder unit in a fourth direction opposite the third direction.

13. The working tool according to claim 1 further comprising:

a biasing member configured to bias the feeder unit to move in a fourth direction, wherein the second drive unit moves the feeder unit in the third direction.

14. The working tool according to claim 1, wherein the second drive unit moves the feeder unit in the third direction and a fourth direction opposite the third direction.

15. A working tool comprising:

a magazine unit accommodating collated fasteners, wherein the collated fasteners are fasteners connected together and arranged in a coil;

an ejection unit to which the fasteners are fed one by one;

a striking unit operable to move in a first direction to strike one of the fasteners fed to the ejection unit;

a biasing unit configured to bias the striking unit to move in the first direction;

a lifting unit configured to be engaged with the striking unit and operable to be rotated to lift the striking unit in a second direction opposite the first direction;

a first drive unit configured to rotate the lifting unit;

a feeder unit operable to move in a third direction crossing the first and second directions and configured to feed the fasteners stored in the magazine unit to the ejection unit one by one;

a second drive unit configured to drive the feeder unit; and a control unit configured to:

control the first drive unit and the second drive unit; and activate the second drive unit when the first drive unit is activated and a load current of the first drive unit becomes below a current threshold.

16. The working tool according to claim 15, wherein the control unit further includes a detection unit configured to detect a position of the striking unit, and wherein the control unit determines that the load current of the first drive unit becomes below a current threshold when the striking unit moves from a standby position to strike the fasteners and stops at the standby position.

17. A working tool comprising:

a battery;

a magazine unit accommodating collated fasteners, wherein the collated fasteners are fasteners connected together and arranged in a coil;

an ejection unit to which the fasteners are fed one by one;

a striking unit operable to move in a first direction to strike one of the fasteners fed to the ejection unit;

a biasing unit configured to bias the striking unit to move in the first direction;

a lifting unit configured to be engaged with the striking unit and operable to be rotated to lift the striking unit in a second direction opposite the first direction;

a first drive unit, powered by the battery, configured to rotate the lifting unit;

a feeder unit operable to move in a third direction crossing the first and second directions and feed the fasteners stored in the magazine unit to the ejection unit one by one;

a second drive unit, powered by the battery, configured to drive the feeder unit; and a control unit configured to:

control the first drive unit and the second drive unit, and activate the second drive unit based on a charge level of the battery.

18. The working tool according to claim 17, wherein the control unit is further configured to delay activating the second drive unit when the charge level of the battery decreases.

19. The working tool according to claim 17, wherein the control unit is further configured to activate the second drive unit based on a load current of the first drive unit becoming below a current threshold set based on the charge level of the battery.

20. A working tool comprising:

a battery;

a magazine unit accommodating collated fasteners, wherein the collated fasteners are fasteners connected together and arranged in a coil;

an ejection unit to which the fasteners are fed one by one;

a striking unit operable to move in a first direction to strike one of the fasteners fed to the ejection unit;

a biasing unit configured to bias the striking unit to move in the first direction;

a lifting unit configured to be engaged with the striking unit and operable to be rotated to lift the striking unit in a second direction opposite the first direction;

a first drive unit, powered by the battery, configured to rotate the lifting unit;

a feeder unit operable to move in a third direction crossing the first and second directions and feed the fastener stored in the magazine unit to the ejection unit;

a second drive unit configured to drive the feeder unit; and a control unit configured to control the first drive unit and the second drive unit; and wherein the control unit includes a detection unit configured to detect a position of the striking unit, and is further configured to activate the second driving unit in response to (1) the detection unit detecting that the striking unit is positioned at a predetermined position and then (2) an operation status of the first driving unit satisfying a predetermined condition.

21. The working tool according to claim 20, wherein the control unit is further configured to determine that the operation status of the first driving unit satisfies the predetermined condition when a load current of the first drive unit becomes below a current threshold.

* * * * *